US011255417B2

(12) United States Patent
Schönekäs et al.

(10) Patent No.: US 11,255,417 B2
(45) Date of Patent: Feb. 22, 2022

(54) HYDRODYNAMIC COUPLING ARRANGEMENT

(71) Applicant: ZF FRIEDRICHSHAFEN AG, Friedrichshafen (DE)

(72) Inventors: Jens Schönekäs, Grafenrheinfeld (DE); Georg Mencher, Bergrheinfeld (DE)

(73) Assignee: ZF Friedrichshafen AG, Friedrichshafen (DE)

(*) Notice: Subject to any disclaimer, the term of this patent is extended or adjusted under 35 U.S.C. 154(b) by 189 days.

(21) Appl. No.: 16/478,403

(22) PCT Filed: Dec. 18, 2017

(86) PCT No.: PCT/EP2017/083208
§ 371 (c)(1),
(2) Date: Jul. 16, 2019

(87) PCT Pub. No.: WO2018/130377
PCT Pub. Date: Jul. 19, 2018

(65) Prior Publication Data
US 2019/0376590 A1    Dec. 12, 2019

(30) Foreign Application Priority Data

Jan. 16, 2017  (DE) ..................... 10 2017 200 552.1

(51) Int. Cl.
*F16H 45/02*    (2006.01)
*F16H 41/26*    (2006.01)

(52) U.S. Cl.
CPC ............. *F16H 41/26* (2013.01); *F16H 45/02* (2013.01); *F16H 2045/021* (2013.01);
(Continued)

(58) Field of Classification Search
CPC .............. F16H 45/00–2045/0294; F16H 41/26
(Continued)

(56) References Cited

U.S. PATENT DOCUMENTS 7,984,800 B2 *  7/2011  Frey .................. F16H 45/02
                                                192/3.3
8,272,985 B2 *  9/2012  Daniel ............... F16H 45/02
                                                475/5
(Continued)

FOREIGN PATENT DOCUMENTS

DE    32 22 119     10/1983
DE    199 53 172    5/2001
(Continued)

*Primary Examiner* — Richard M Lorence
(74) *Attorney, Agent, or Firm* — Cozen O'Connor

(57) ABSTRACT

A hydrodynamic coupling arrangement has a housing connected to pressure medium lines for conducting pressure medium into or out of a pressure space sealed by a piston of a clutch device relative to a toroidal space of a hydrodynamic circuit provided in the housing. A rotatable area is provided for axially displaceably receiving a radially inner piston hub of the piston of the clutch device, and at least one through-opening which is rotatable relative to the housing is provided in a through-opening area for producing at least one flow connection between at least one pressure medium line and the pressure space. The receiving area and the through-opening area are in rotational communication with a retarding device influencing a flow of pressure medium in the pressure space, this flow of pressure medium arriving in the pressure space after passing through the through-opening area.

23 Claims, 20 Drawing Sheets

(52) U.S. Cl.
CPC ............... *F16H 2045/0215* (2013.01); *F16H 2045/0226* (2013.01); *F16H 2045/0231* (2013.01); *F16H 2045/0247* (2013.01); *F16H 2045/0284* (2013.01)

(58) Field of Classification Search
USPC .................................... 192/3.28–3.31, 106 F
See application file for complete search history.

(56) References Cited

U.S. PATENT DOCUMENTS

| | | |
|---|---|---|
| 2004/0172936 A1 | 9/2004 | Mueller et al. |
| 2007/0205067 A1* | 9/2007 | Frey ..................... F16H 45/02 192/3.3 |
| 2014/0137547 A1 | 5/2014 | Fingerman et al. |
| 2017/0328454 A1* | 11/2017 | Matsuda ................. F16D 13/40 |

FOREIGN PATENT DOCUMENTS

| | | |
|---|---|---|
| DE | 10 2004 010 262 | 9/2004 |
| DE | 10 2007 014 311 | 10/2008 |
| DE | 10 2012 214 233 | 5/2014 |
| EP | 1 830 107 | 9/2007 |

* cited by examiner

Fig. 22
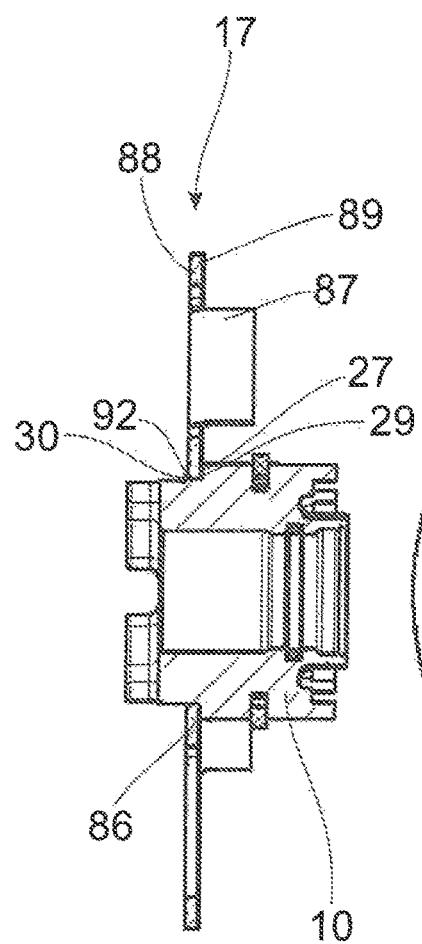
Fig. 24
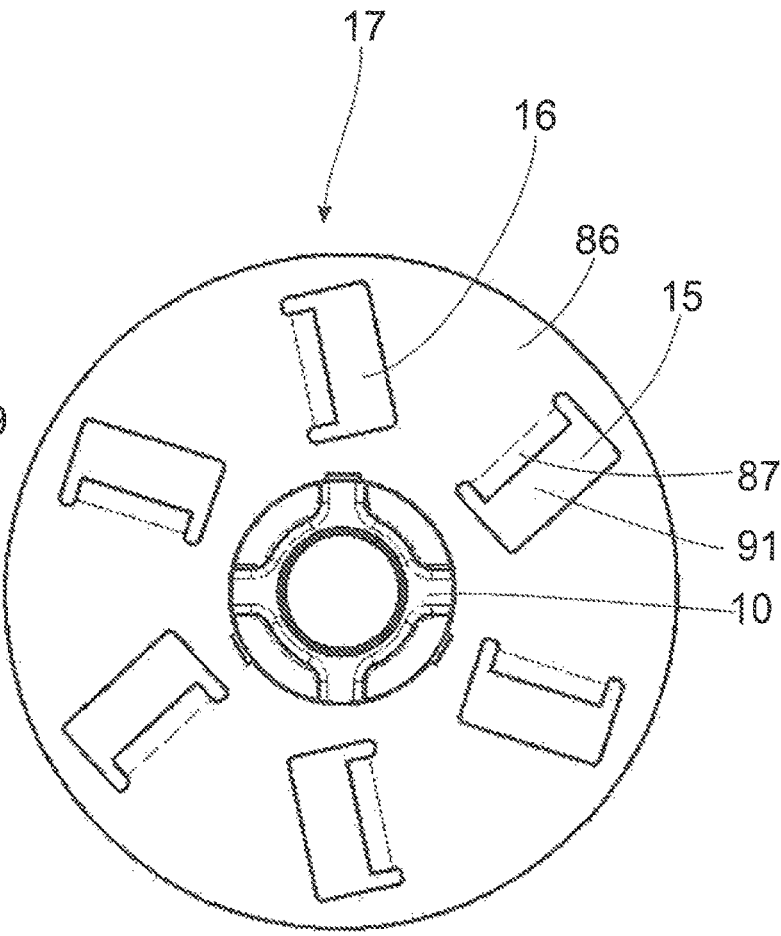
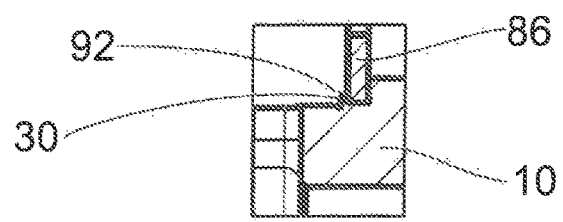
Fig. 23

HYDRODYNAMIC COUPLING ARRANGEMENT

CROSS REFERENCE TO RELATED APPLICATIONS

This is a U.S. national stage of application No. PCT/EP2017/083208, filed on Dec. 18, 2017. Priority is claimed on German Application No. DE10 2017 200 552.1, filed Jan. 16, 2017, the content of which is incorporated herein by reference.

BACKGROUND OF THE INVENTION

1. Field of the Invention

The present invention is directed to a hydrodynamic coupling arrangement with a housing connected to pressure medium lines for conducting pressure medium into or out of at least one pressure space that is at least substantially sealed by a piston of a clutch device relative to a toroidal space of a hydrodynamic circuit, which toroidal space is likewise provided in the housing, and a receiving area, which is rotatable relative to the housing, is provided for axially displaceably receiving a radially inner piston hub of the piston of the clutch device, and a through-opening which is rotatable relative to the housing is provided in a through-opening area for producing at least one flow connection between at least one pressure medium line and the pressure space.

2. Description of the Prior Art

A hydrodynamic coupling arrangement of the type mentioned above which is constructed as a hydrodynamic torque converter is known from DE 10 2007 014 311 A1. The housing of this coupling arrangement, which is rotatable around a central axis, forms an impeller at its output side. Together with a turbine and a stator axially arranged between impeller and turbine, the impeller forms a hydrodynamic circuit. The turbine is fastened to a torsional vibration damper having a torsional vibration damper hub that is connected to be fixed with respect to relative rotation via a first toothing to a transmission input shaft acting as output of the hydrodynamic coupling arrangement and via a second toothing to the supply hub. The transmission input shaft has pressure medium lines, whereof a central first pressure medium line leads to the through-opening area formed in a supply hub, while a second pressure medium line running radially outwardly of the central first pressure medium line leads to a connection area axially spaced from the through-opening area of the supply hub. The through-opening area opens into the pressure space located axially between an input-side housing wall and the piston of the clutch device, and the connection area opens into an intermediate space which extends axially between the piston of the clutch device and a dividing wall which radially partitions the housing. The side of the dividing wall remote of the intermediate space adjoins a toroidal space receiving the hydrodynamic circuit, torsional vibration damper and portions of the clutch device.

Since the dividing wall is connected to the housing so as to be fixed with respect to rotation relative to it, this dividing wall rotates around the central axis at the speed of the housing, and the piston of the clutch device also rotates approximately at the housing speed because the radially outer seal of the piston achieves an appreciably higher driving effect because of its large radius compared with the radially inner seal of the piston. Accordingly, a pressure medium contained in the pressure space and in the intermediate space is acted upon substantially by the input speed so that pressure conditions are comparable in this respect on both sides of the piston, which becomes noticeable in an advantageous manner during an engaging or disengaging process of the clutch device. However, this advantage is achieved only because of the dividing wall, which increases the quantity of component parts of the coupling arrangement on the one hand and enlarges its axial dimension on the other hand.

If the dividing wall were omitted from the known hydrodynamic coupling arrangement, the toroidal space would reach all the way to the piston of the clutch device. Since essential elements contained in the toroidal space such as the turbine and the output of the torsional vibration damper are operated substantially at output speed, the pressure medium contained in the toroidal space would be acted upon substantially by output speed. In contrast, the conditions in the pressure space would not change, so that the pressure medium contained therein would continue to be acted upon substantially by input speed. Assuming an open clutch device, a considerable difference in pressure would be observed because of the different rotational speeds of the pressure medium in the pressure space and in the toroidal space, which can lead to unwanted axial displacement of the piston. If this axial displacement of the piston takes place, for example, in the disengaging direction, not only would the actual closing pressure of the piston have to be adjusted via the pressure medium lines for engagement, but a force corresponding in magnitude to the pressure difference would also have to be adjusted because of the speed difference in the pressure medium. Since this pressure difference varies depending on the respective speed, a clean engagement of the piston is problematic.

SUMMARY OF THE INVENTION

It is an object of one aspect of the invention to configure a hydrodynamic coupling arrangement in such a way that an unproblematic engagement or disengagement of the piston of a clutch device is ensured in a compact construction.

In order to meet this object, a hydrodynamic coupling arrangement is provided with a housing connected to pressure medium lines for conducting pressure medium into or out of at least one pressure space that is at least substantially sealed by means of a piston of a clutch device relative to a toroidal space of a hydrodynamic circuit, which toroidal space is likewise provided in the housing, and a receiving area, which is rotatable relative to the housing, is provided for axially displaceably receiving a radially inner piston hub of the piston of the clutch device, and a through-opening which is rotatable relative to the housing is provided in a through-opening area for producing at least one flow connection between at least one pressure medium line and the pressure space.

It is particularly significant that the receiving area as well as the through-opening area are in rotational communication with a retarding device influencing a flow of pressure medium in the pressure space, wherein the flow of pressure medium arrives in the pressure space after passing through the through-opening area.

Since the piston of the clutch device is arranged by its radially inner piston hub on a receiving area and this receiving area is rotatable relative to the housing, the receiving area is moved at a different speed—a slower speed in traction mode—than the housing which rotates at input speed. If the receiving area is provided at a structural component part, which is fixed with respect to relative rotation to an output-side component part such as a turbine or the output of a torsional vibration damper, the receiving area rotates at output speed. Because of the rotational connection of the receiving area and of the through-opening area to the retarding device, the pressure medium flow arriving in the pressure space after passing through the through-opening area is influenced by the retarding device in that the pressure medium flow is retarded to a rotational speed which at least substantially approximates a rotational speed otherwise applied at output speed. This is also the case when the pressure space should be provided axially between the converter housing and the piston and, accordingly, between two component parts moving substantially at input speed. Located on the opposite side of the piston of the clutch device is the toroidal space in which output-side component parts in particular such as the turbine or the output of the torsional vibration damper exert a substantial influence on the rotational speed of the pressure medium. Accordingly, the rotational speed of the pressure medium in the toroidal space also substantially approximates the output speed.

Accordingly, by retarding the rotational speed of the pressure medium on the input side of the piston by the retarding device to the rotational speed of the pressure medium on the output side of the piston, comparable rotational speeds of the pressure medium are present on both sides of the piston so that an unwanted operational pressure difference in the spaces on both sides of the piston is prevented. This makes itself noticeable in an advantageous manner during an engaging or disengaging process of the clutch device because even a comparably low pressure applied via one of the pressure lines is sufficient to generate an axial displacement of the piston relative to the receiving area.

As has already been indicated, the retarding device is provided for influencing a flow of pressure medium in the pressure space. For this purpose, the retarding device has a swirl blading provided with at least one swirl blade having at least substantially an extension radially outward into the pressure space. Accordingly, the retarding device provides displacement surfaces and/or shearing surfaces for the pressure medium contained in the pressure space by the at least one swirl blade. In this way, the retarding device is able to act upon the pressure medium contained in the pressure space with a speed which is below the input speed provided by the housing and piston during traction operation. Since this pressure medium is conducted into the pressure space via the through-opening area which is fixed to rotate with the retarding device, it need only be attempted via the retarding device to prevent an increase in the rotational speed in the pressure medium caused by the action of the housing and piston. While this function could be carried out with only one swirl blade, it is better for preventing unbalances when the retarding device has a swirl blading preferably having pairs of swirl blades, each of which is provided diametrically with respect to a central axis of the housing of the coupling arrangement.

The at least one swirl blade is preferably received so as to be fixed with respect to relative rotation either at a blade hub of the swirl blading or at a supply hub which receives this blade hub so as to be fixed with respect to rotation relative to it, and the receiving area or the through-opening area can also be provided either at the blade hub or at the supply hub.

The at least one swirl blade of the swirl blading and the blade hub can be provided so as to be constructed in one piece. Alternatively, the at least one swirl blade can be fastened to the blade hub or to the supply hub. This can be carried out, for example, in that the at least one swirl blade is inserted into a receptacle of the blade hub or of the supply hub, which receptacle extends in extension direction of the central axis. Although the at least one swirl blade is in this way prevented from rotating, additional axial retaining elements are necessary. Alternatively, the at least one swirl blade can also be fastened to the blade hub, namely, by frictionally engaging connection such as by a press fit or shrink fit, or by a bonding connection such as welding or soldering.

Regardless of its connection to the swirl blading, the at least one swirl blade can be formed in accordance with respective requirements. In this regard, a substantial feature of the construction consists in that the at least one swirl blade extends with at least one component in radial direction, i.e., radial to the central axis, and/or with at least one component in axial direction, i.e., in the extension direction of the central axis. The at least one swirl blade is produced most simply in technical respects relating to manufacture when it is formed in radial direction and/or in axial direction at least substantially without curvature. However, the at least one swirl blade can be more advantageous with respect to fluidics when it is formed in radial direction and/or in axial direction at least substantially with curvature. The at least one swirl blade can be arranged so as to be inclined in radial direction and/or so as to be inclined opposite axial direction. With inclination in radial direction, the effect of the at least one swirl blade will be reinforced when oriented opposite the rotational direction of the swirl blading and the effect of the at least one swirl blade will be attenuated when oriented in rotational direction of the swirl blading.

An advantageous configuration of the swirl blading consists in that the swirl blading is formed with a blade carrier, which is fixed with respect to rotation relative to a blade hub and, in order to form the at least one swirl blade, at least one blade carrier segment, which is separated from the blade carrier by clearance machining, is made to emerge with at least one component in axial direction relative to one of the end faces of the blade carrier. In this way, a manufacturing process for connecting the blade carrier and swirl blade can be dispensed with because both component parts come from a common starting component part. The effect of the swirl blades on the pressure medium surrounding them is further strengthened when the blade carrier, adjoining a blade carrier segment in circumferential direction in each instance, is provided with a radial cutout extending radially inward from the circumferential area because the circumferential edges of the radial cutout also act on the pressure medium.

In an alternative configuration, the swirl blading, which has a blade carrier fixed with respect to rotation to the blade hub, can cause at least one blade carrier segment to emerge by plastic shaping of the blade carrier relative to one of its end faces in order to form the at least one swirl blade. The rear side of the swirl blade at the other end face of the blade carrier then manifests itself as offset to the rear relative to this end face.

Also, when the swirl blading is formed with a blade carrier having at least one blade carrier segment serving as swirl blade, the at least one swirl blade can deviate from the radial direction with an inclination opposite its rotational direction or with an inclination corresponding to its rotational direction.

The swirl blading can be supplemented in a very advantageous manner in that the through-opening area can project farther radially outward with respect to the central axis of the housing of the coupling arrangement than the radially inner piston hub of the piston surrounding the receiving area for the radially inner piston hub. Since the receiving area and the through-opening area are both actuated with relative speed with respect to the housing of the coupling arrangement and therefore at reduced speed relative to the housing speed in traction operation, the pressure medium flowing through the through-opening area arrives in the pressure space not only at a reduced speed relative to the housing speed due to this step but is also moved relatively far radially outward into the pressure space, i.e., brakes pressure medium contained in the pressure space also.

BRIEF DESCRIPTION OF THE DRAWINGS

The invention will be described in more detail in the following referring to an embodiment example. The drawings show:

FIG. 22 is a blade carrier fastened to the supply hub by a press fit;

FIG. 23 is a blade carrier with an enlarged separate depiction of the area of the press fit;

FIG. 24 is a top view of the swirl blading shown in FIG. 22;

DETAILED DESCRIPTION OF THE PRESENTLY PREFERRED EMBODIMENTS

Figure 1:
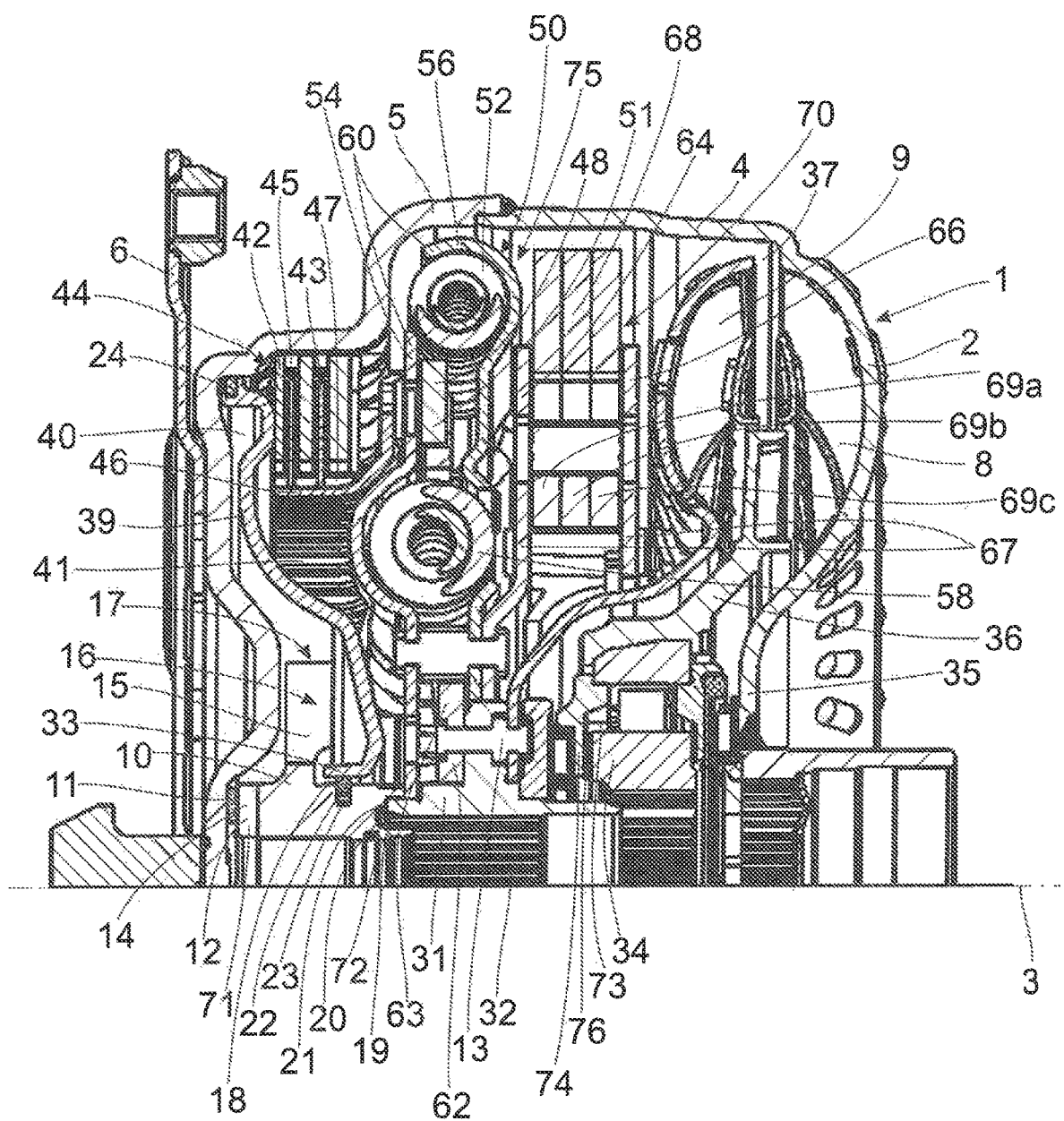
FIG. 1 is a sectional view of a hydrodynamic coupling arrangement in the form of a hydrodynamic torque converter with a housing which receives a supply hub axially between a housing cover and a torsional vibration damper, which supply hub is intended to pass pressure medium and has a retarding device having a swirl blading, wherein the retarding device is formed in one piece with the supply hub.

FIG. 1 is a sectional view showing a coupling arrangement 1 in the form of a hydrodynamic torque converter 2. A housing 4 which is rotatable around a central axis 3 is provided at its side facing a drive, such as an internal combustion engine, with a housing cover 5 to which a drive plate 6 is fastened. The drive plate 6 can be connected via a flexplate, not shown, to a crankshaft of the drive so as to be fixed with respect to rotation relative to it. A flexplate of this kind and the crankshaft of the drive connected to it are shown in DE 32 22 119 C1 in FIG. 1.

At its side remote of the housing cover 5, the housing 4 forms an impeller 8 with which a turbine 9 is associated axially opposite. The turbine 9 is connected via a plurality of fastening elements 13 provided along its circumference to an output hub 31 so as to be fixed with respect to rotation relative to it. The output hub 31 is connected to an output, not shown, such as a transmission input shaft of a transmission, so as to be fixed with respect to rotation relative to it by an inner toothing 32. The output hub 31 is supported in axial direction at one end at the housing cover 5 of housing 4 via a supply hub 10 and a spacer ring 11 and at the other end at a freewheel 34, which is in turn axially supported at an output-side housing hub 35 of housing 4. The freewheel 34 centers a stator 36 arranged axially between the impeller 8 and turbine 9 and, together with the impeller 8 and the turbine 9, forms a hydrodynamic circuit 37.

At its side facing the spacer ring 11 and therefore facing the housing cover 5, the supply hub 10 has a through-opening area 12 with at least one through-opening 14, but preferably with a plurality of through-openings 14 uniformly distributed along the circumference. Axially adjacent to the through-opening area 12, the supply hub 10 transitions into at least one swirl blade 15, but preferably into a plurality of swirl blades 15 which are evenly distributed along the circumference. The at least one swirl blade 15 is part of a swirl blading 16 that is part of a retarding device 17, to be described more fully later, for pressure medium flowing through the at least one through-opening 14. A receiving area 18 for a piston 39 of a clutch device 44 axially adjoins the swirl blading 16. A recess 23 for receiving a seal 22 in operative communication with a piston hub 33 forming the radially inner end of piston 39 is provided in the receiving area 18. The axial end of the supply hub 10 remote of the through-openings 14 has an axial projection 19 which has an outer toothing and which engages by its outer toothing in the inner toothing 32 of output hub 31 so as to be fixed with respect to rotation relative to it. Lastly, the supply hub 10 is provided axially adjacent to axial projection 19 with a connection area 21 having at least one aperture 20 for the passage of pressure medium.

At its radially outer end, piston 39 receives a seal 24 via that it operatively communicates at least substantially in radial direction with the housing cover 5 and therefore with housing 4. Due to the fact that the seal 24 is operative on a considerably larger diameter than the seal 22 facing piston hub 33 and, in addition, since a frictional force has an appreciably greater effect between housing cover 5 and outer seal 24 than between piston hub 33 and seal 22, the piston 39 rotates around the central axis 3 substantially at the speed of housing 4 and therefore at the input speed. In contrast, supply hub 10 and therefore retarding device 17 rotate at the speed of the output hub 31 and therefore at output speed.

A pressure space 40 located axially between piston 39 and housing cover 5 is defined by piston 39, while the axial opposite side of piston 39 defines a toroidal space 41 surrounding a plurality of clutch elements 42, 43 which, together with piston 39, form a clutch device 44. Radially outer first clutch elements 42 are received at housing 4 so as to be fixed with respect to rotation relative to it by a toothing 45, while radially inner second clutch elements 43 rotatably communicate with an inner clutch element carrier 46 by a toothing 47, which inner clutch element carrier 46 rotatably communicates with a radially outer hub disk 51 acting as input 48 of a torsional vibration damper 50. The radially outer hub disk 51 acts in circumferential direction on a radially outer first damper unit 52 of torsional vibration damper 50. The radially outer first damper unit 52 is supported at its circumferential side remote of radially outer hub disk 51 at cover plates 54, 56 which form the output of radially outer first damper unit 52 on the one hand and the input of a radially inner second damper unit 58 of torsional vibration damper 50 on the other hand and are therefore referred to hereinafter as intermediate transmission elements 60. The radially inner second damper unit 58 is supported by its circumferential side remote of intermediate transmission elements 60 at a radially inner hub disk 62 which is connected to the output hub 31 so as to be fixed with respect to rotation relative to it and which forms an output 63 of torsional vibration damper 50.

A damper mass carrier element 64 of a mass damper system 70 is fastened to intermediate transmission elements 60 of torsional vibration damper 50. The input-side damper mass carrier element 64 together with an output-side damper mass carrier element 66 at an axial distance therefrom forms a damper mass carrier 67. This damper mass carrier 67 serves to receive a plurality of damper masses 68 distributed along the circumference. Each of these damper masses 68 can be assembled from a plurality of damper mass elements 69a, 69b, and 69c in axial direction. A plurality of spacer pieces, not shown, are provided for the axial connection of the two damper mass carrier elements 64 and 66. Fixed relative to one another in this way, the two damper mass carrier elements 64 and 66 retain axially therebetween the damper mass elements 69a to 69c of the respective damper mass 68. Like damper mass elements 64, 66, the damper mass elements 69a to 69c have guideways which are known per se and therefore not shown and which operatively communicate with one another through roller-shaped coupling elements and ensure that the damper masses 68 can carry out relative deflections with respect to damper mass carrier 67 in radial direction and in circumferential direction. The only variable quantity in the mass damper system 70 is the rotational speed so that this mass damper system 70 acts in a speed-adaptive manner. Together with mass damper system 70, the torsional vibration damper 50 forms a vibration damping arrangement 75.

Through-opening 14 is part of a first pressure medium line 71, aperture 20 is part of a second pressure medium line 72 and a passage 76 in a compression bearing 74 provided axially between output hub 31 and freewheel 34 is part of a third pressure medium line 73. Pressure medium lines 71 to 73 are not shown in their entirety, since the construction of such pressure medium lines may be gleaned in detail from the above-cited DE 10 2007 014 311 A1. As is shown in DE 10 2007 014 311 A1 in FIG. 1, the first pressure medium line can run, for example, in the interior of a sleeve provided in the center of a transmission input shaft, while the second pressure medium line runs radially outwardly of this sleeve but still inside of the transmission input shaft. Lastly, the third pressure medium line runs radially between the outside of the transmission input shaft and a supporting sleeve for the freewheel receiving the stator.

As has already been mentioned, piston 39 of clutch device 44 rotates around central axis 3 essentially at the speed of the housing 4 and accordingly—assuming traction operation—at input speed. In contrast, supply hub 10 and therefore swirl blading 16 of retarding device 17 rotates around central axis 3 at the speed of the output hub 31 and therefore, owing to the rotational connection of the output hub 31 to the transmission input shaft, at output speed, namely, also in traction operation. While pressure medium which arrives in the pressure space 40 via first pressure medium line 71 and the at least one through-opening 14 would exit from at least one through-opening 14 at output speed, housing cover 5 and piston 39 would act upon the pressure medium with input speed radially farther outward and accordingly generate a rotation in the pressure medium in the pressure chamber 40 around the central axis at a speed at least substantially approximating the input speed. This effect is countered by the swirl blading 16 in that the latter extends far radially outward into pressure space 40 and, owing to its rotation at output speed, counteracts an acceleration of the pressure medium through housing cover 5 and piston 39. Accordingly, swirl blading 16 performs the function of a retarding device 17 for the pressure medium.

While piston 39 of clutch device 44 rotates at least substantially at input speed, essential component parts in the toroidal space 41 are moved at a slower rotational speed.

That is, while the output 63 of torsional vibration damper 50 as well as the turbine 9 rotate respectively at output speed, intermediate transmission elements 60 and mass damper system 70 adopt a rotational speed which is lower than the input speed but higher than the output speed. In the toroidal space 41, pressure medium is introduced into the toroidal space via the second pressure medium line 72 and, accordingly, aperture 20 of connection area 21, i.e., moves around central axis 3 at a rotational speed comparable to the pressure medium introduced into the pressure space 41. Accordingly, the pressure medium in both spaces 40 and 41 will rotate around central axis 3 with a rotational speed of a magnitude between the input speed and the output speed. As a result of these comparable rotational speeds in the two chambers 40 and 41, piston 39 of clutch device 44 is acted upon by comparable pressures on both sides so that an arbitrary increase in pressure in one of the two chambers 40 or 41 first leads to an axial displacement of piston 39 and accordingly to an engagement or disengagement of piston 39. On the other hand, unwanted operational axial displacements of piston 39 can be effectively prevented because of the retarding device 17.

Figure 2:
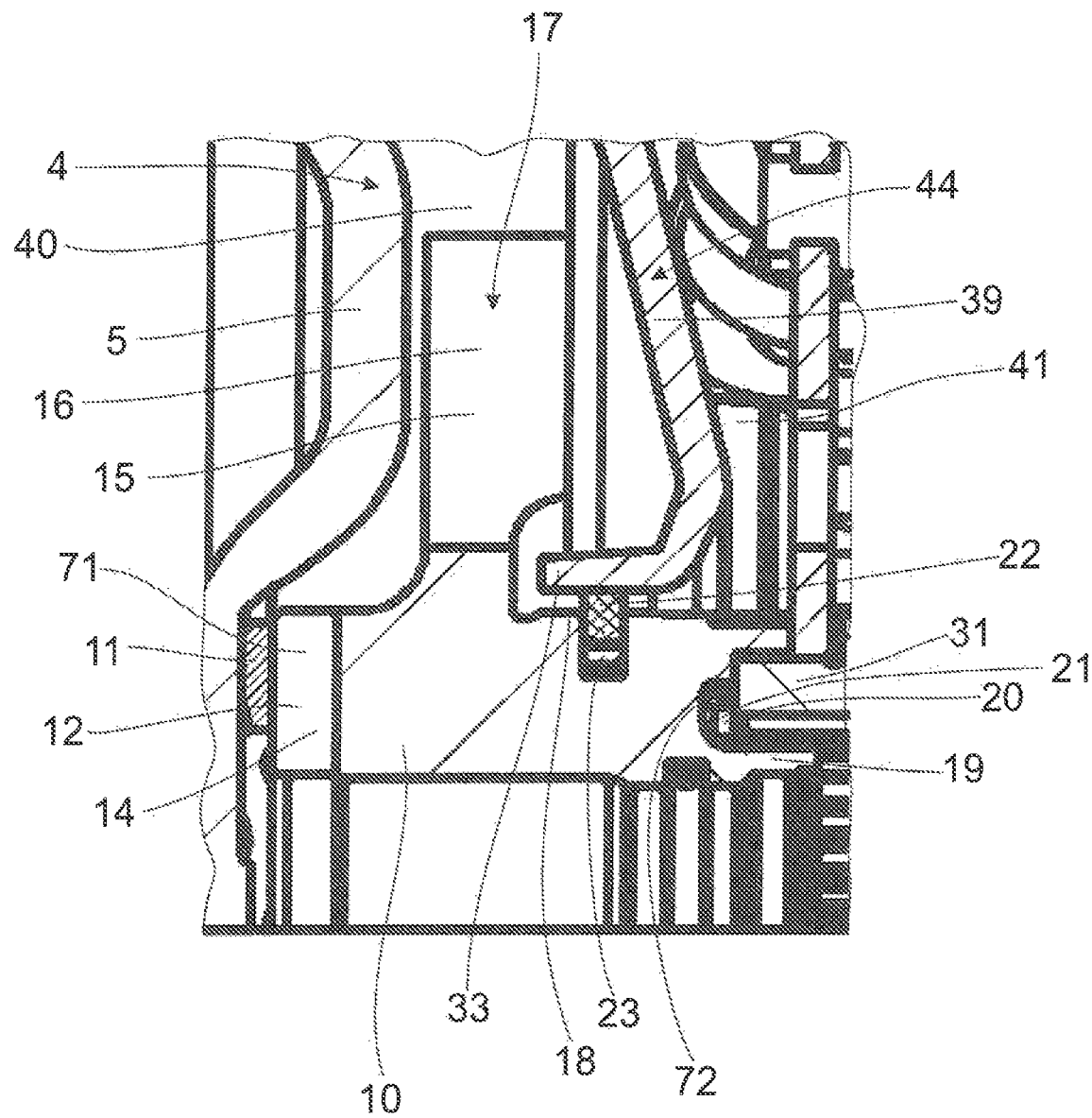
FIG. 2 is a separate depiction of the supply hub with the retarding device having a swirl blading, in an enlarged view.
Figure 3:
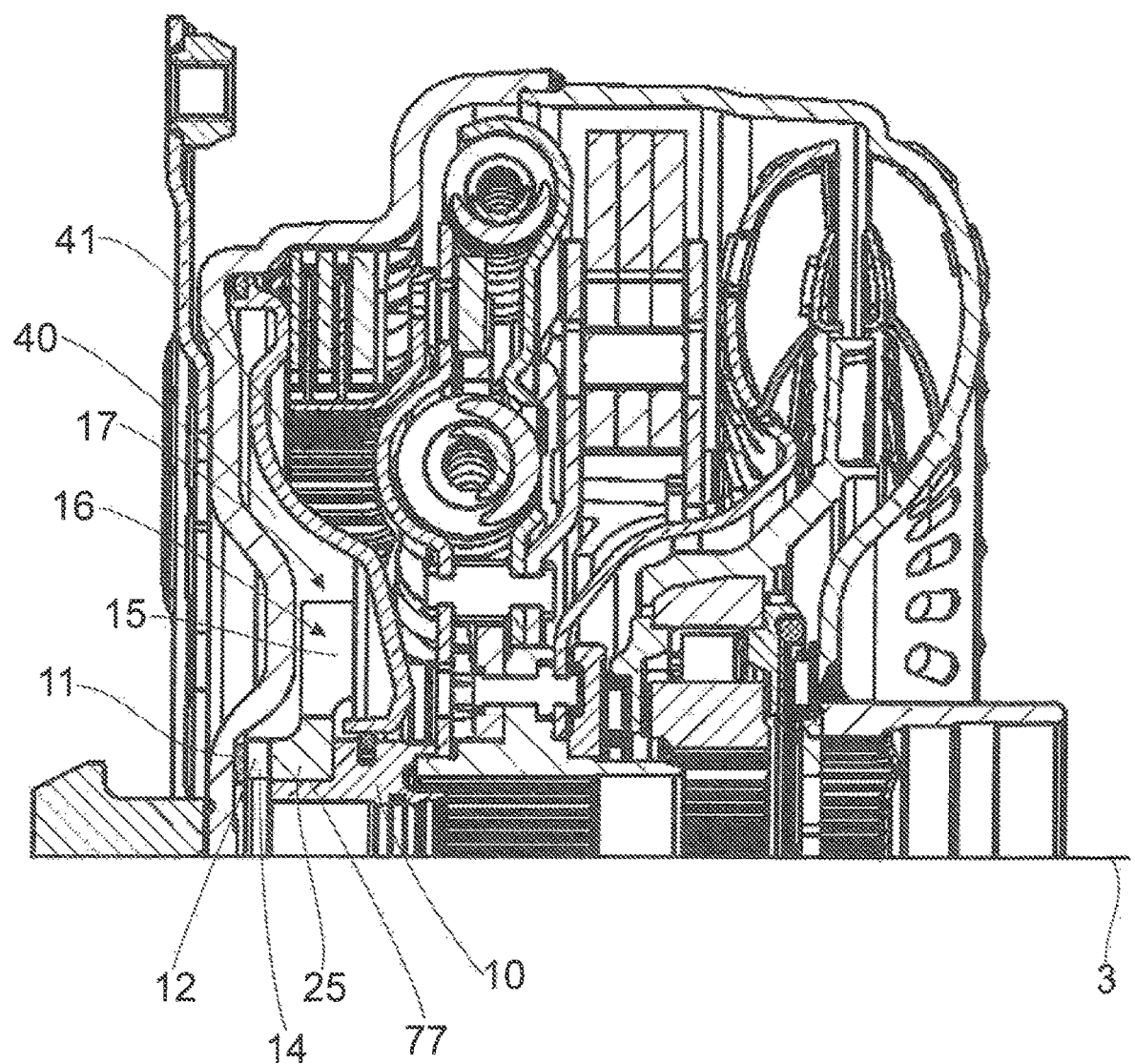
FIG. 3 is as in FIG. 1 but with the swirl blading of the retarding device constructed with a blade hub and swirl blades provided integral with the latter, wherein the blade hub is received at the supply hub so as to be fixed with respect to rotation relative to it.

As is shown in FIGS. 1 and 2, the at least one swirl blade 15 of swirl blading 16 is formed in one piece with the supply hub 10. In contrast, FIG. 3 shows a construction in which the swirl blading 16 has a blade hub 25 which is formed in one piece with the at least one swirl blade 15 on the one hand and is connected to a centering seat 77 of supply hub 10 so as to be fixed with respect to rotation relative to it on the other hand. Further, blade hub 25 of swirl blading 16 is provided with the at least one through-opening 14 of through-opening area 12 of retarding device 17. In spite of these minor structural difference, this retarding device 17 functionally corresponds to the retarding device 17 described with reference to FIG. 1 or 2.

Figures 4, 5:
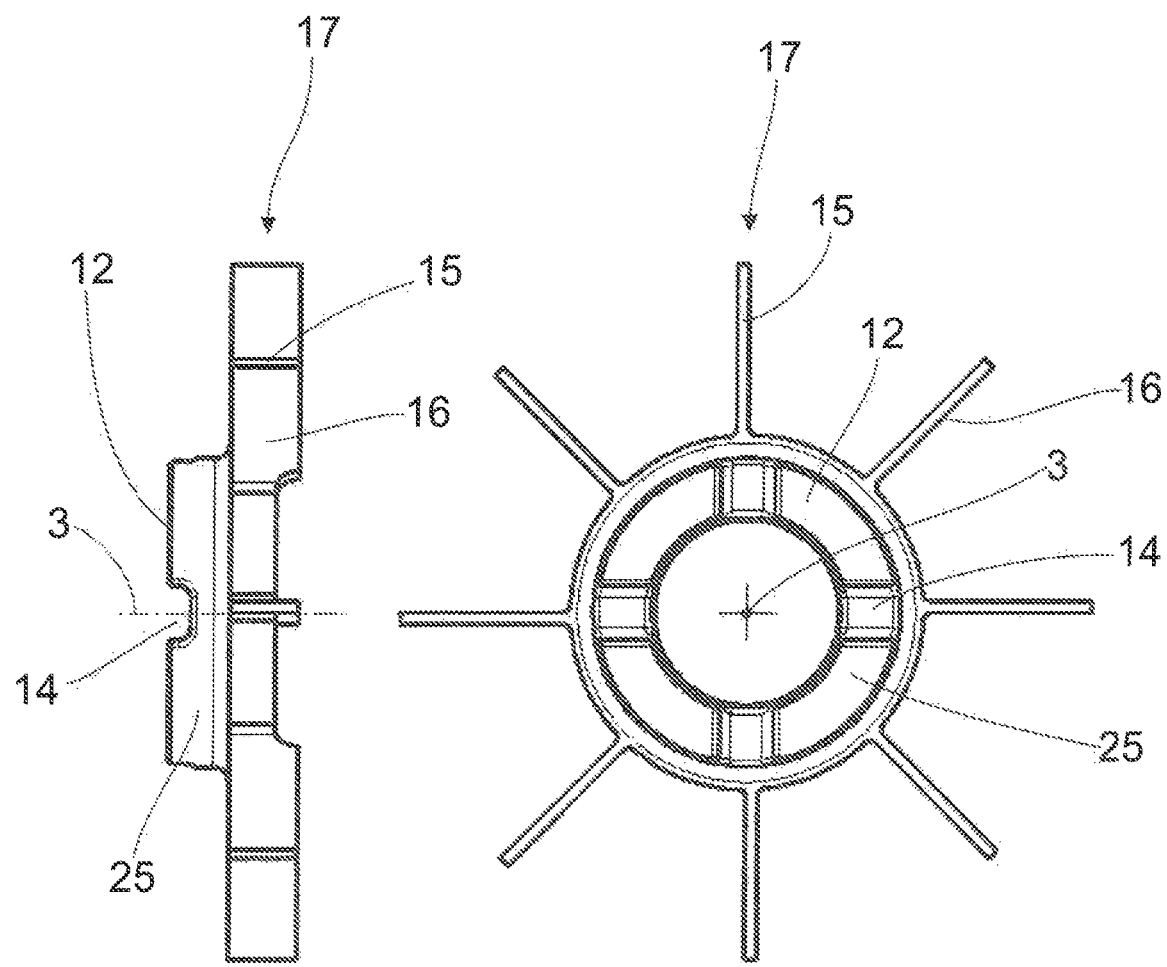
FIG. 4 is a separate depiction of the swirl blading of the retarding device according to FIG. 3 in an enlarged view with curvature-free construction of the swirl blades with radial extension.
FIG. 5 is a top view of the swirl blading shown in FIG. 4.

The swirl blading 16 according to FIG. 3, which acts as retarding device 17, is depicted separately in FIGS. 4 and 5. As can clearly be seen, blade hub 25 is substantially ring-shaped and forms one piece with a plurality of swirl blades 15 which are provided so as to be substantially equidistant to one another along the circumference. Swirl blades 15 are oriented respectively to central axis 3 and are substantially free from curvature in radial direction (FIG. 5) as well as in axial direction (FIG. 4).

At its side facing the spacer ring 11 (FIG. 3) and therefore the housing cover 5, the blade hub 25 is provided with through-openings 14 for pressure medium so that this substantially annular area of the blade hub 25, which annular area is formed axially adjacent to swirl blades 15, acts as through-opening area 12.

Figures 6, 7:
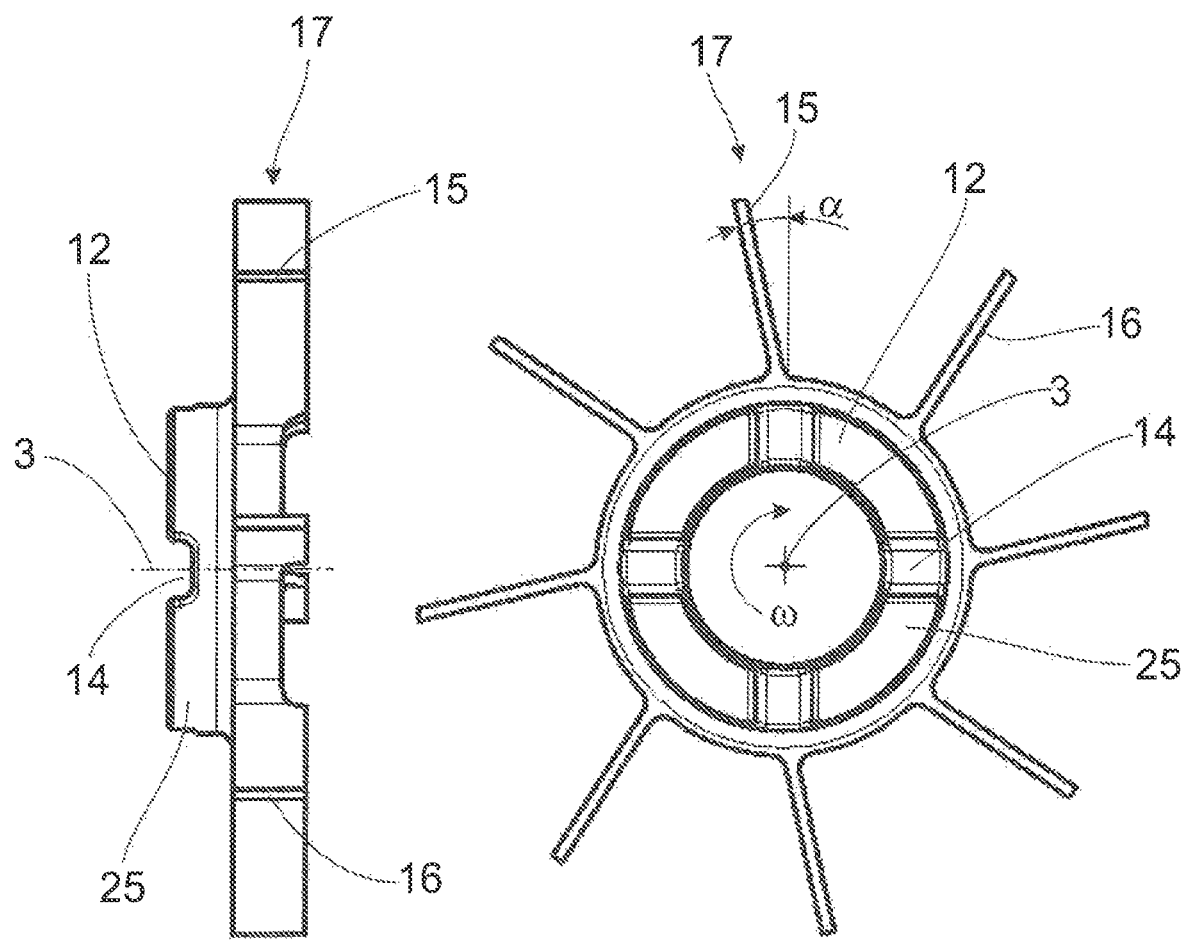
FIG. 6 is a swirl blading with swirl blades provided so as to be inclined relative to the radial extension opposite the rotational direction.
FIG. 7 is a top view of the swirl blading shown in FIG. 6.

The retarding device 17 of FIGS. 6 and 7 deviates from the retarding device 17 of FIGS. 4 and 5 in that the swirl blades 15 of swirl blading 16 extend at an inclination of an angle α relative to a substantially radial orientation, namely, opposite the rotational direction indicated by an arrow ω.

Figures 8, 9:
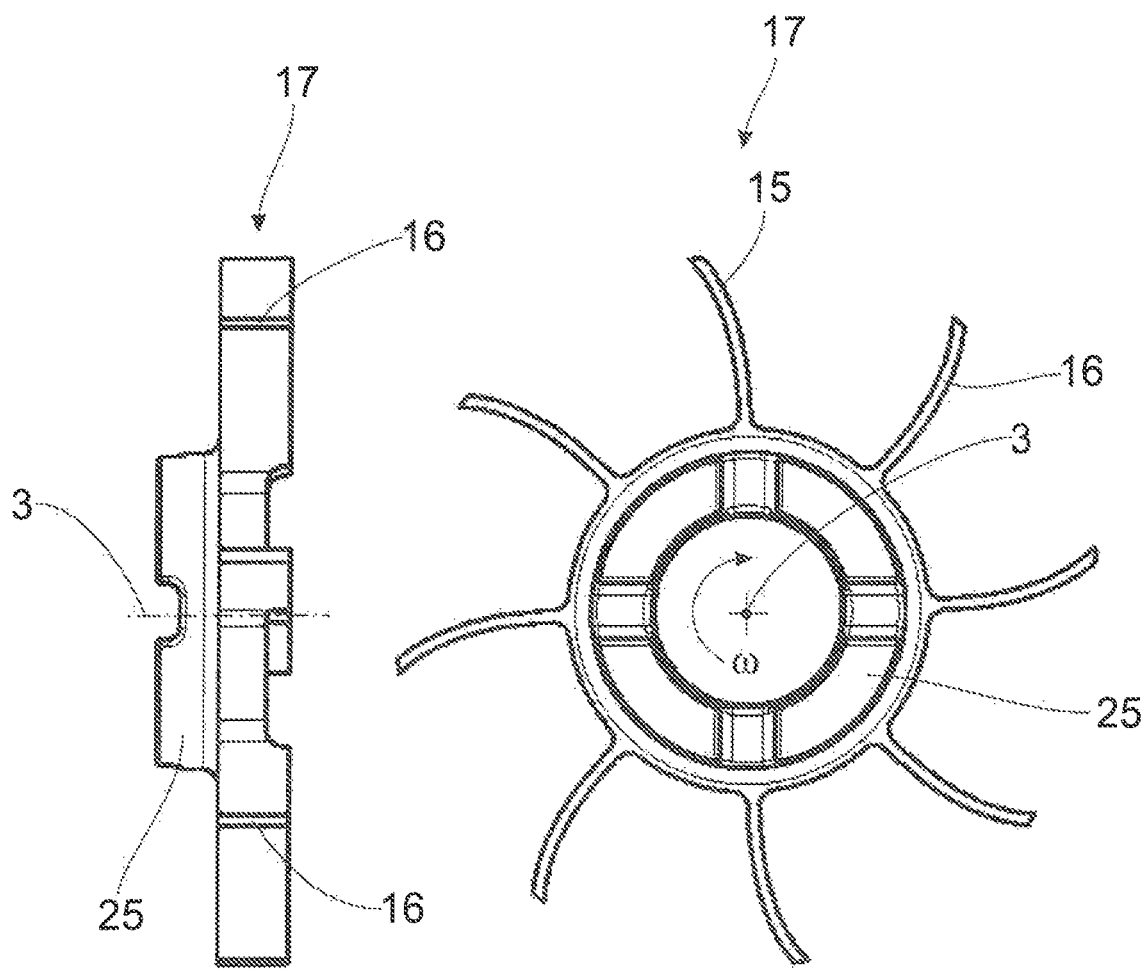
FIG. 8 is a swirl blading with curved formation of the swirl blades that deviate from the radial extension and are curved opposite the rotational direction.
FIG. 9 is a top view of the swirl blading shown in FIG. 8.

Also in the retarding device 17 of FIGS. 8 and 9, the swirl blades 15 of swirl blading 16 are inclined relative to a substantially radial orientation and, moreover, proceed in radial direction with curvature opposite the rotational direction indicated by an arrow ω.

Figure 10:
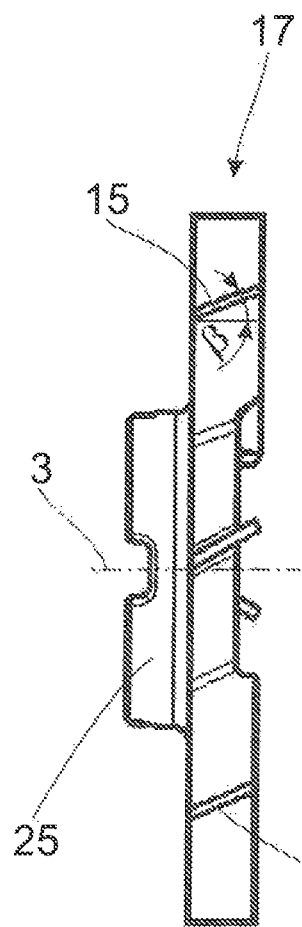
FIG. 10 is a swirl blading with swirl blades that are inclined without curvature relative to the axial extension opposite the rotational direction.
Figure 11:
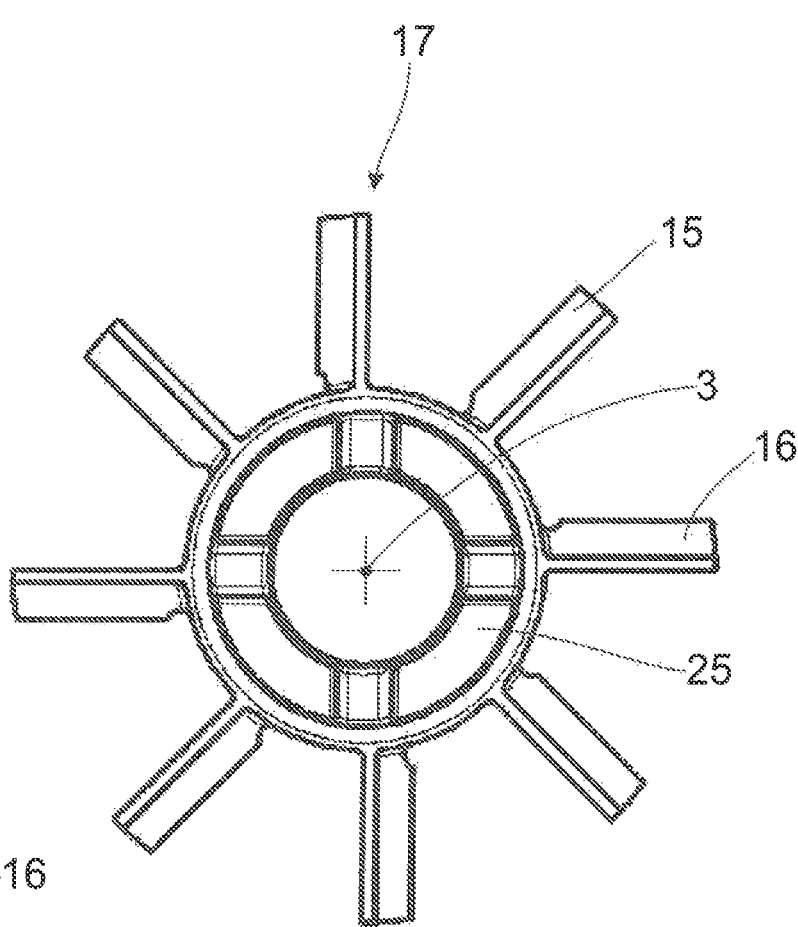
FIG. 11 is a top view of the swirl blading shown in FIG. 10.

Swirl blades 15 of swirl blading 16 in FIGS. 10 and 11 are substantially oriented to central axis 3 and accordingly extend radially. In axial direction, however, swirl blades 15 deviate by an angle β relative to the extension direction of central axis 3. However, swirl blades 15 are substantially free from curvature in radial direction and in axial direction.

Figures 12, 13:
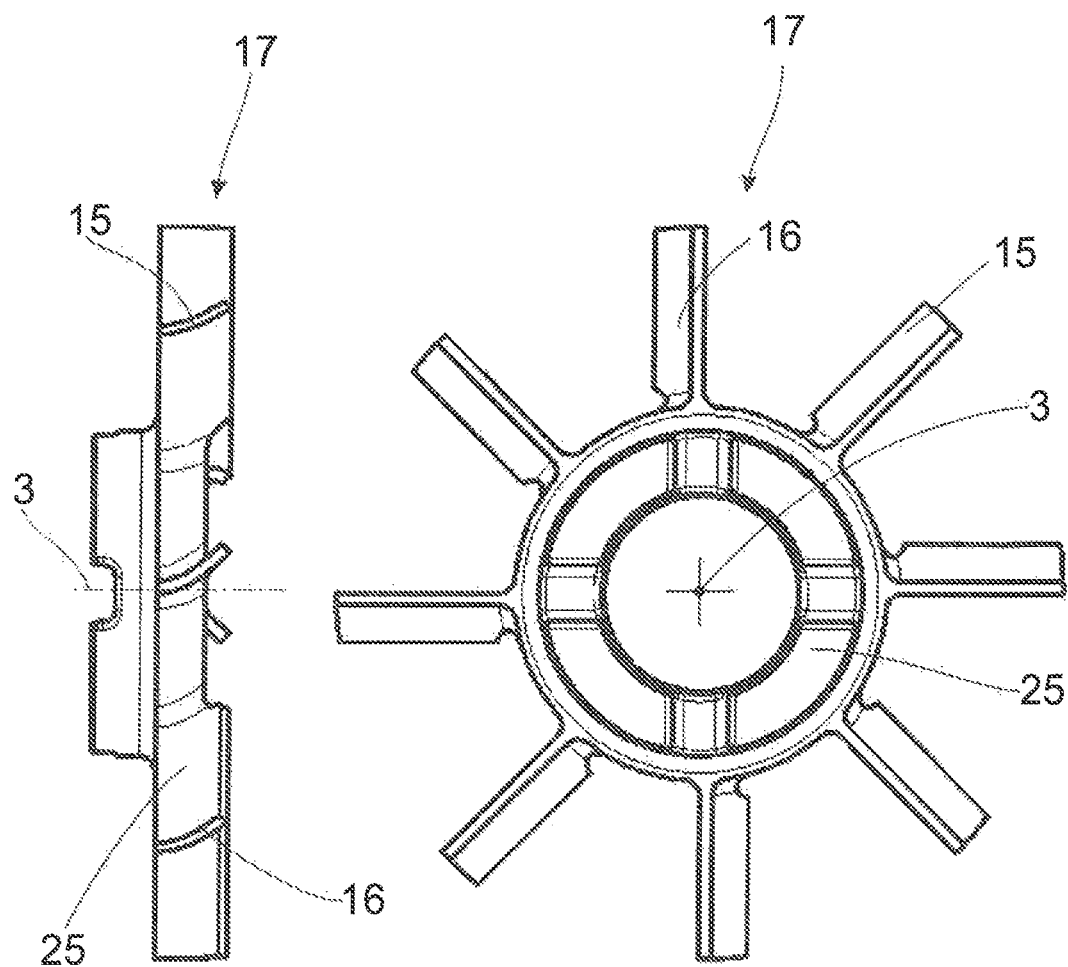
FIG. 12 is a swirl blading with swirl blades that are inclined with curvature relative to the axial extension opposite the rotational direction.
FIG. 13 is a top view of the swirl blading shown in FIG. 12.

In contrast, swirl blades 15 of swirl blading 16 in FIGS. 12 and 13 are oriented substantially to central axis 3 in radial direction but not only deviate in axial direction relative to the extension direction of central axis 3 but, moreover, have curvature in this direction.

Figures 14, 15:
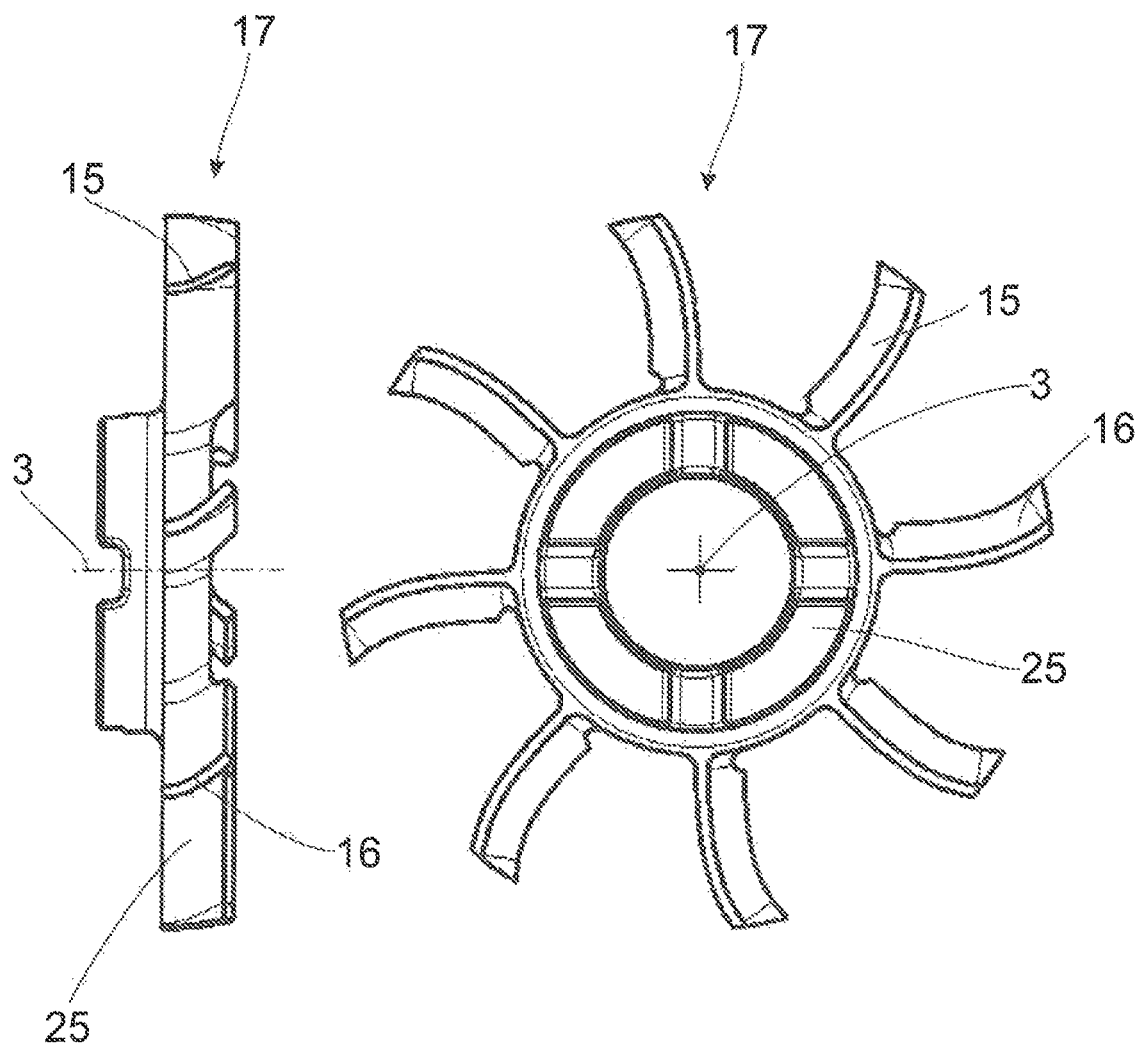
FIG. 14 is a swirl blading with swirl blades that are inclined with curvature relative to the axial extension and relative to the radial extension opposite the rotational direction.
FIG. 15 is a top view of the swirl blading shown in FIG. 14.

FIGS. 14 and 15 show a swirl blading 16 having swirl blades 15 which are inclined relative to a substantially radial orientation and, moreover, extend with curvature in radial direction opposite the rotational direction indicated by an arrow ω. The swirl blades 15 also deviate in axial direction relative to the extension direction of central axis 3 and also have curvature in this direction.

Figure 16:
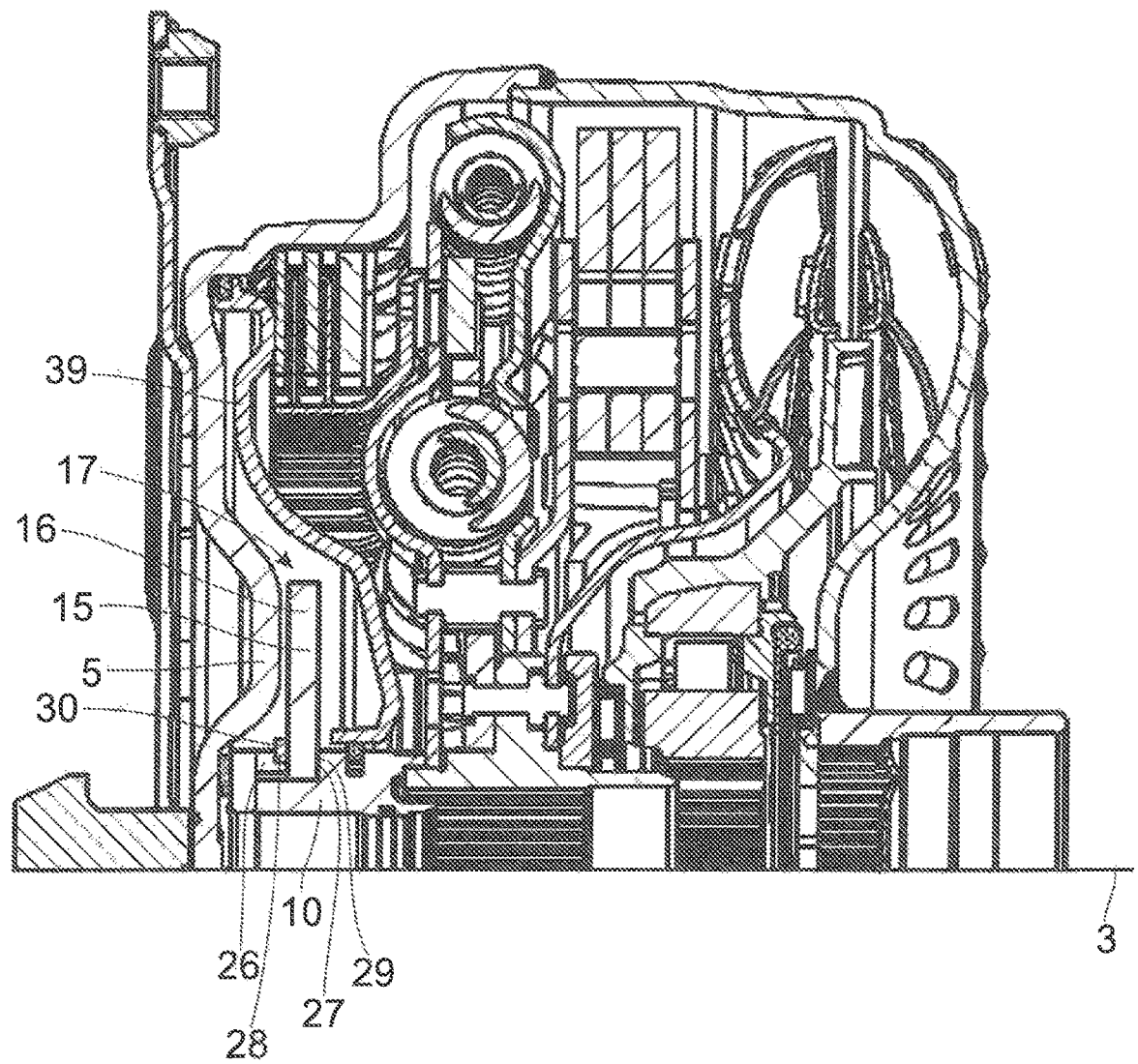
FIG. 16 is swirl blades that are received directly at the supply hub.

FIG. 16 shows a construction of the retarding device 17 in which the at least one swivel blade 15 of swivel blading 16 is received directly at the supply hub 10. For this purpose, supply hub 10 has a receptacle 26 which extends substantially in the extension direction of central axis 3 and which is adapted in circumferential direction to the corresponding swirl blade 15 so that insertion of swirl blade 15 into receptacle 26 prevents rotation. The respective swirl blade 15 axially contacts a stepping 27 of supply hub 10 by its end face facing piston 39, while the end face of swirl blade 15 facing housing cover 5 is held axially by a retaining ring 28 which is recessed into the circumference of supply hub 10. Stepping 27 forms first axial retainer 29 for swirl blade 15 and the retaining ring 28 forms second axial retaining means.

Figure 17:
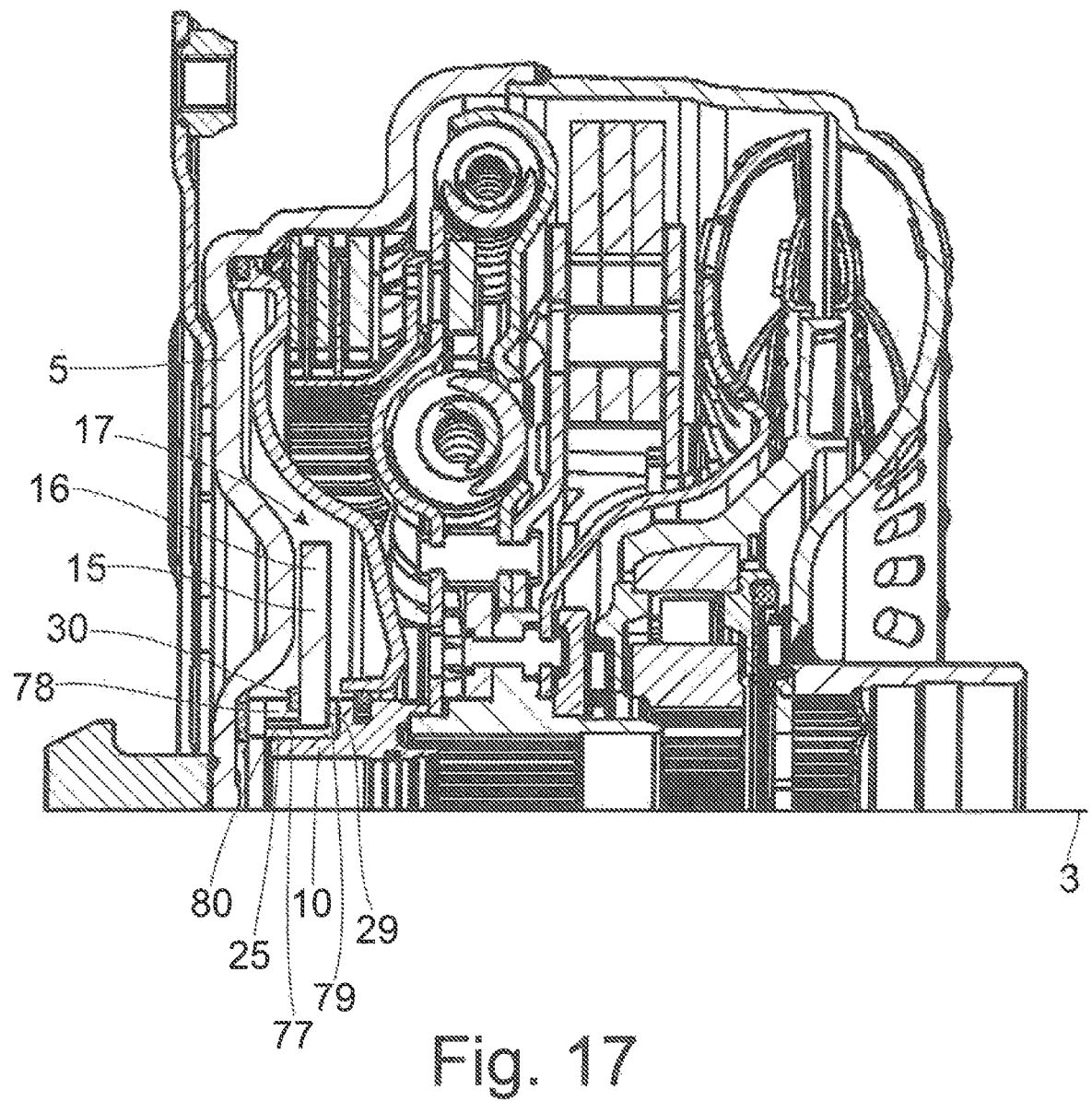
FIG. 17 is swirl blades that are received at a blade hub supported by the supply hub.

The construction of the retarding device 17 shown in FIG. 17 corresponds extensively to the construction described in FIG. 16, but differs in that the at least one swirl blade 15 of swirl blading 16 has a blade hub 75. This blade hub 25 is fastened to a centering seat 77 of supply hub 10. As concerns the at least one swirl blade 15 of swirl blading 16, this swirl blade 15 is inserted into a receptacle 78 that extends substantially in extension direction of central axis 3 and which is adapted in circumferential direction to the corresponding swirl blade 15 so that when swirl blade 15 is inserted into receptacle 78 a rotation prevention element 82 is provided as can be discerned in FIG. 19. The respective swirl blade 15 axially contacts a radial projection 79 of blade hub 25 with its end face directed toward piston 39, while the end face of swirl blade 15 facing housing cover 5 is axially held by a retaining ring 80 which is recessed into the circumference of blade hub 25. Radial projection 79 forms first axial retaining means 29 for swirl blade 15, and retaining ring 80 forms second axial retainer 30.

Figure 18:
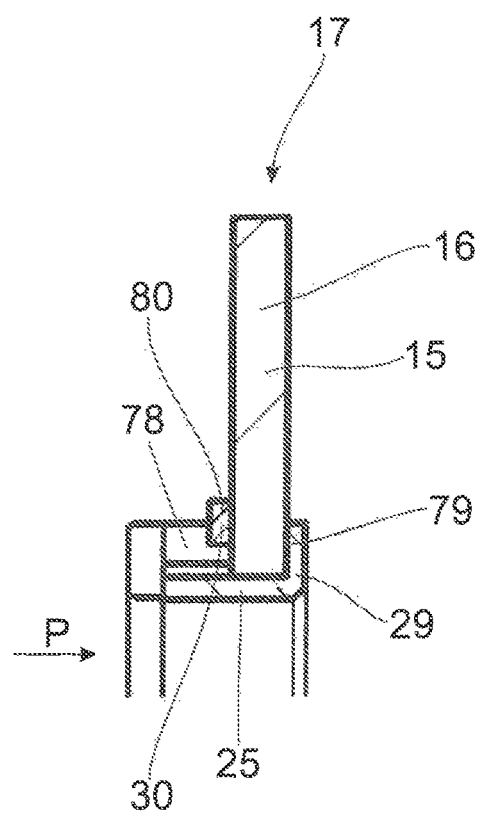
FIG. 18 is a separate depiction of the blade hub shown in FIG. 17 and of the swirl blades in an enlarged view.
Figure 19:
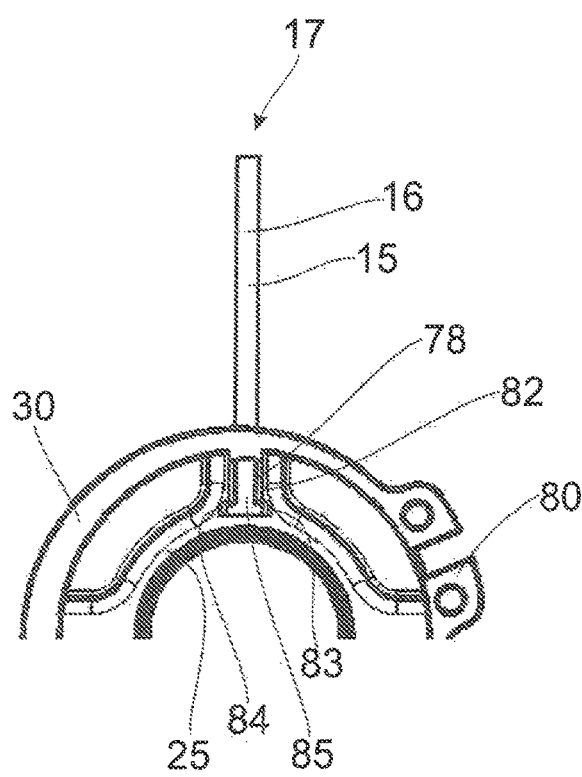
FIG. 19 is a top view of the swirl blading shown in FIG. 18.

While FIG. 18 shows an enlarged view of the swirl blading 16 of FIG. 17 with the at least one swirl blade 15, blade hub 25 and axial retainer 29, 30, FIG. 19 shows a top view of swirl blading 16, namely, from the viewing direction of arrow P shown in FIG. 18. The receptacle 78 for swirl blade 15 can be discerned in FIG. 19, wherein the swirl blade 15 has at its radially inner end a circumferential widening 83 which engages in a correspondingly constructed widened circumference 84 and accordingly acts as radial retainer 85 of swirl blade 15 in receptacle 78.

Figures 20, 21:
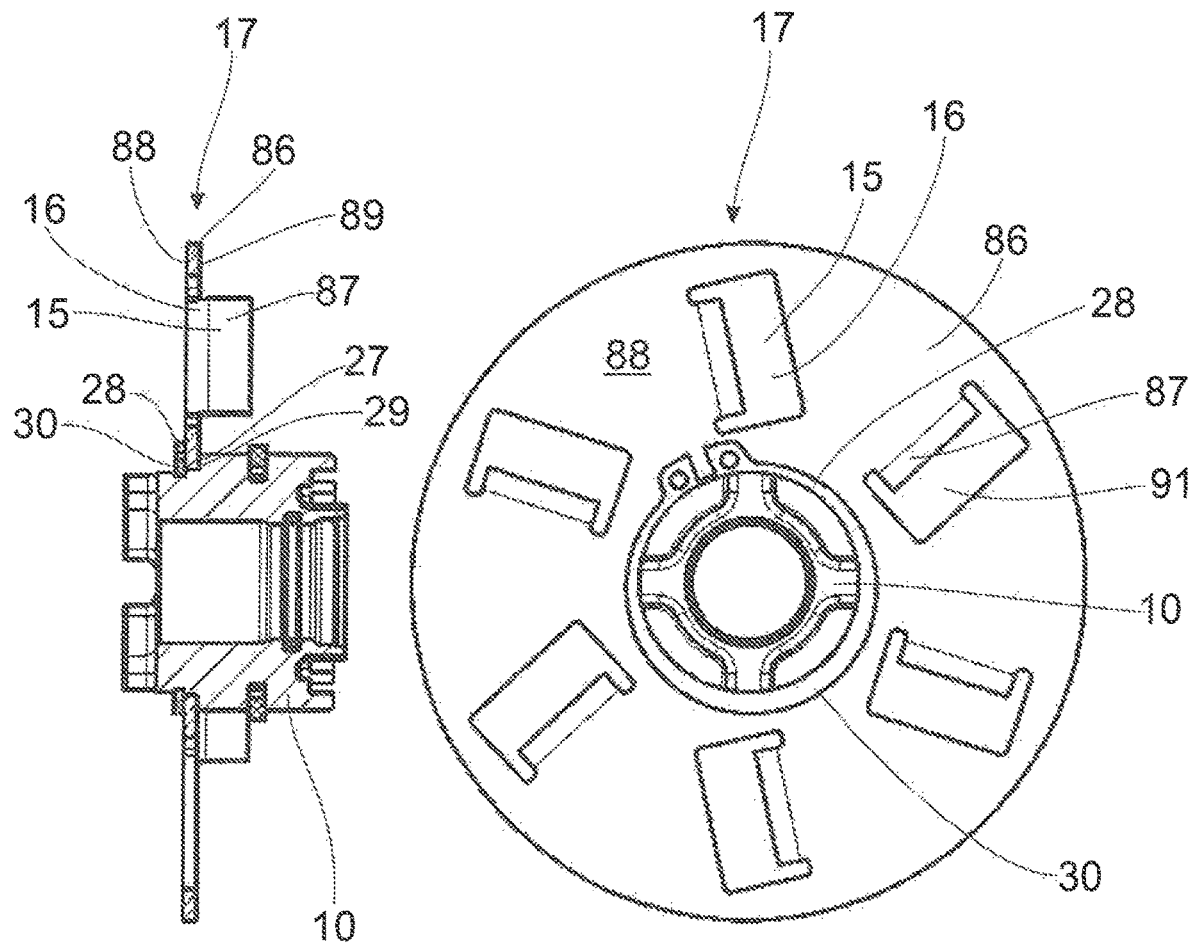
FIG. 20 is a blade carrier of a swirl blading with a plurality of axially extending blade carrier segments acting as swirl blades, which blade carrier is axially fastened to the supply hub by means of a retaining ring.
FIG. 21 is a top view of the swirl blading shown in FIG. 20.

FIGS. 20 and 21 show a construction in which a blade carrier 86 is fastened to supply hub 10 in that an end face 89 of blade carrier 86 comes in abutting contact with a stepping 27 acting as axial retainer 29, and the other end face 88 of blade carrier 86 is held by a retaining ring 28 which is recessed into the circumference of supply hub 10 and forms second axial retainer 30.

Blade carrier 86 is substantially disk-shaped and has a plurality of blade carrier segments 87 which are substantially equidistantly spaced along the circumference. These blade carrier segments 87 are worked out of the rest of the blade carrier 86 by clearance machining manufacturing techniques such as punching or cutting and are subsequently bent out of the extension plane of end faces 88 and 89, for example, in direction of the output-side end face 89 so as to leave a cutout 91 in blade carrier 86. Blade carrier segments 87 can be bent substantially perpendicularly, or at an angle of inclination deviating from the perpendicular, and can extend in their new extension direction substantially without curvature or with predetermined curvature. Each of the blade carrier segments 87 acts as swirl blade 15. Consequently, blade carrier 86 is part of a swirl blading 16 and accordingly forms a retarding device 17.

The blade carrier 86 in FIGS. 22 to 24 substantially corresponds to the blade carrier 86 described earlier and differs merely in the manner in which blade carrier 86 is fastened to supply hub 10. While the end face 89 of blade carrier 86 in FIGS. 22 to 24 comes in abutting contact with stepping 27 which acts as axial retainer 29, the other end face 88 of blade carrier 86 is secured by a press fit 92 which is shown as enlarged detail in FIG. 23, so that the press fit 92 acts as axial retainer 30. Here again, blade carrier segments 87 provided at blade carrier 86 act as swirl blades 15 of a swirl blading 16 and form a retarding device 17.

Figures 25, 26:
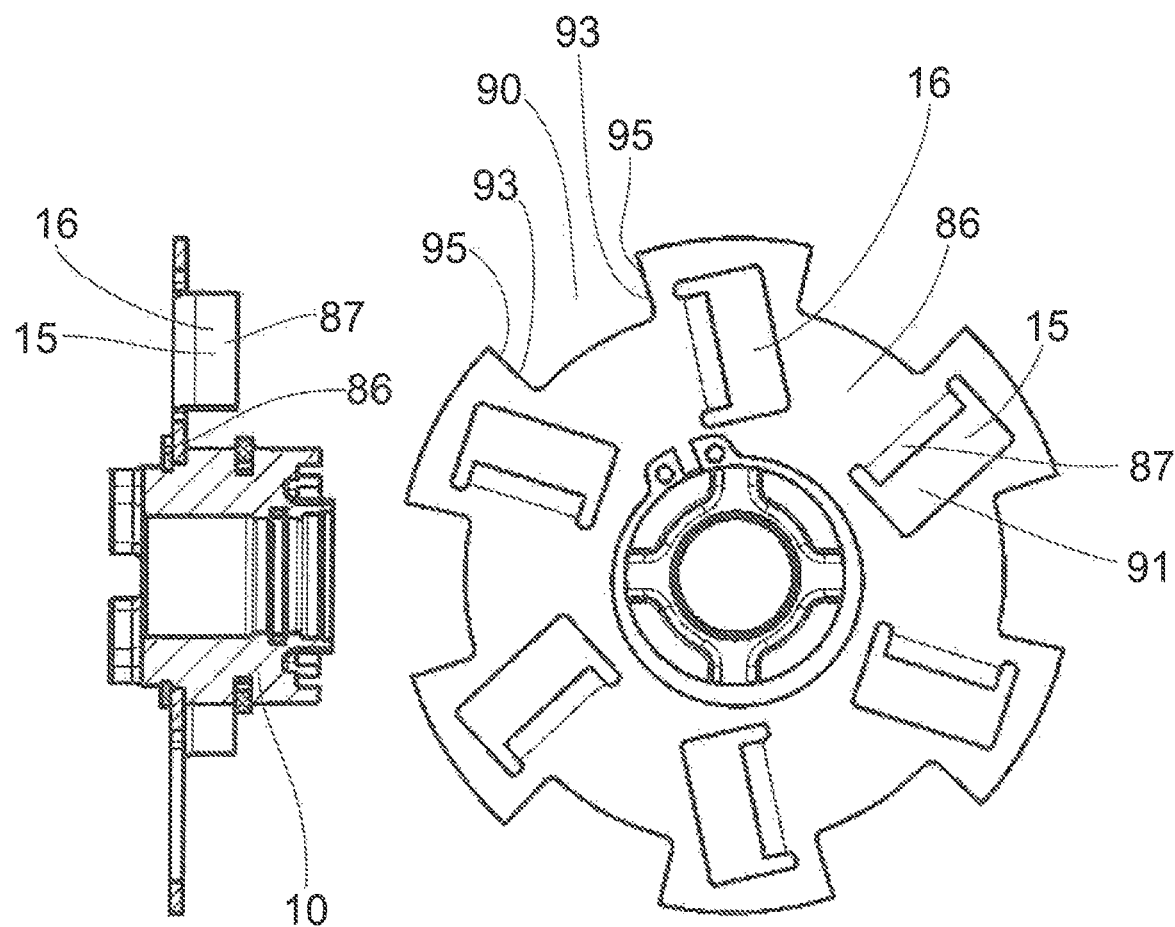
FIG. 25 is a blade carrier with radial cutouts in circumferential direction between each two swirl blades.
FIG. 26 is a top view of the swirl blading shown in FIG. 25.

FIGS. 25 and 26 show the blade carrier 86 shown in FIGS. 22 and 24 but with radial cutouts 90 in circumferential direction between each two radial projections 95 with blade carrier segments 87. This reduces the inertia of blade carrier 86 and therefore of swirl blading 16, and additional retarding surfaces 93 are simultaneously created for a pressure medium flow at the circumferential edges of the radial projections 95 adjoining the respective radial cutouts 90. A particularly advantageous construction of the retarding device 17 is formed in this way.

Figures 27, 28:
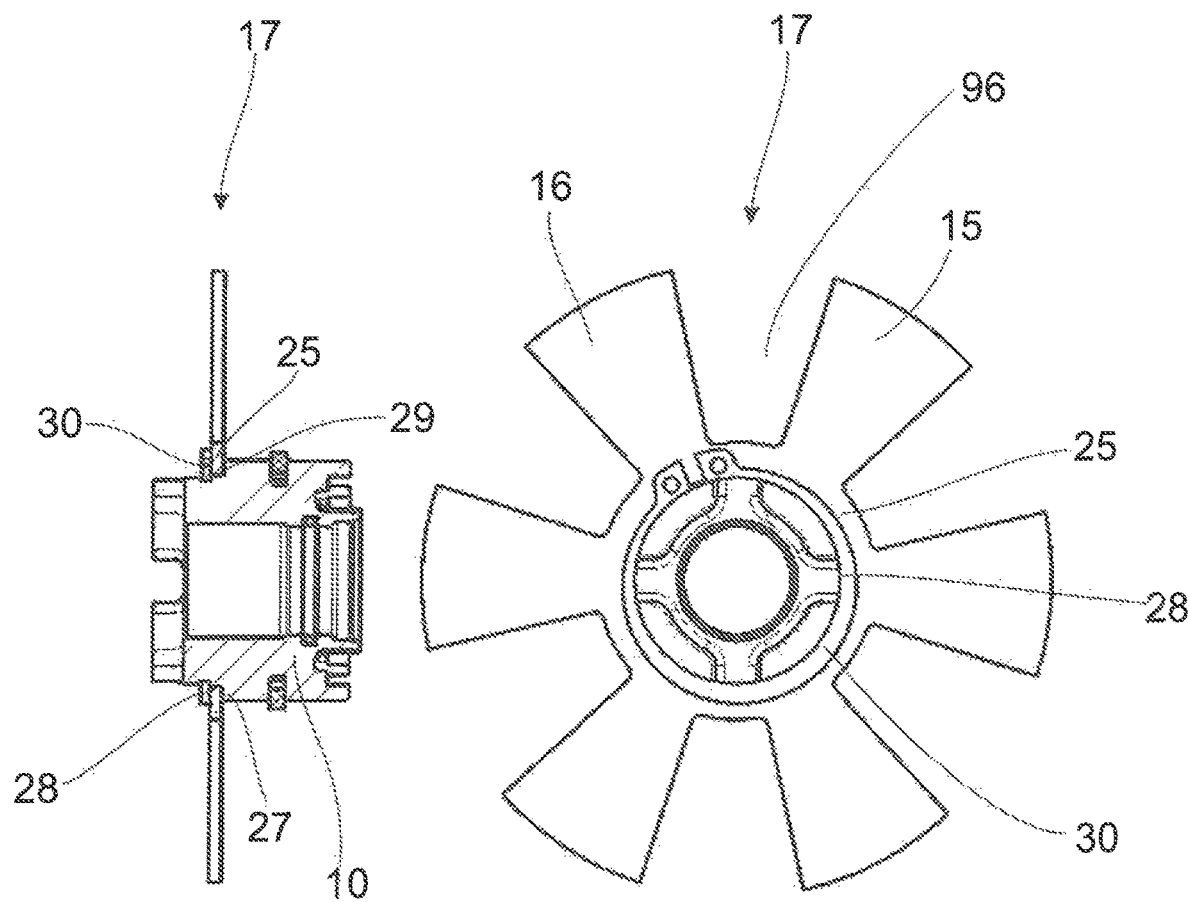
FIG. 27 is a blade carrier with a plurality of blade carrier segments which act as swirl blades and extend at an inclination to the axial extension direction.
FIG. 28 is a top view of the swirl blading shown in FIG. 27.

FIGS. 27 and 28 show a retarding device 17 with blade hub 25 arranged on supply hub 10 so as to be axially secured, namely, through the use of axial retainers 29, 30 that hold blade hub 25 in fixed axial arrangement relative to supply hub 10 and one of which, namely, axial retainer 29, are formed in a manner already described above by a stepping 27 at supply hub 10, and the other axial retaining means 30 are formed by a retaining ring 28 engaging in supply hub 10.

A plurality of swirl blades 15 of swirl blading 16 extend radially outward from blade hub 25 so as to be spaced apart substantially equidistant from one another along the circumference. As is shown in FIG. 27, swirl blades 15 and blade hub 25 have substantially the same axial extension and are formed in one piece with one another. To this extent, a blade carrier such as that denoted by reference numeral 86 in FIGS. 20 to 26 can certainly serve as the basis for producing the swirl blading 16 of FIGS. 27 and 28. Only those areas of the swirl blading 16 which appear as clearances 96 between each two swirl blades 15 in the finished swirl blading 16 would have to be cut out.

Figures 29, 30:
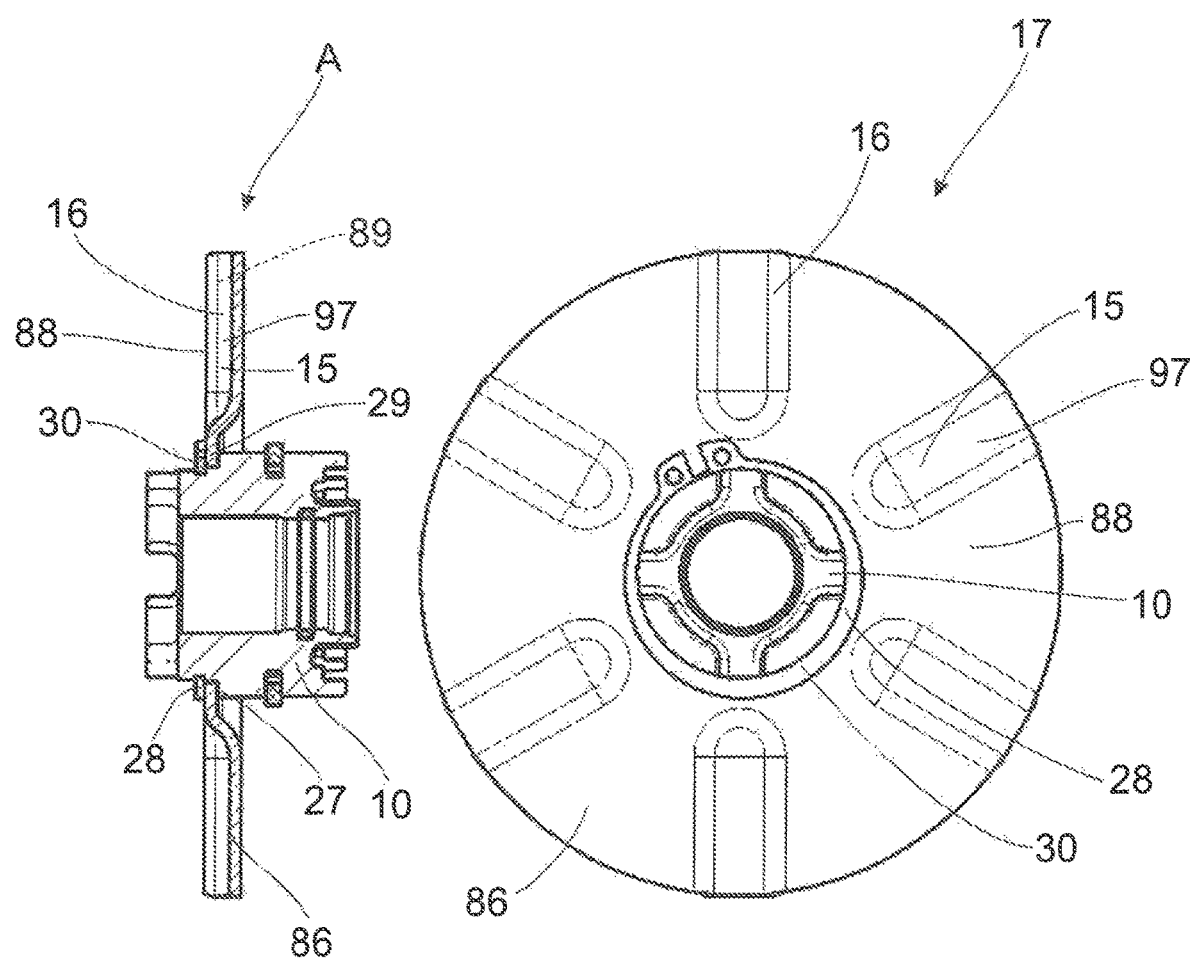
FIG. 29 is a blade carrier of a swirl blading with a plurality of blade carrier segments which serve as swirl blades and which are made to emerge in each instance by means of plastic shaping of the blade carrier relative to one of its end faces, which blade carrier is fastened to the supply hub.
FIG. 30 is a top view of the swirl blading shown in FIG. 29.

The retarding device 17 shown in FIGS. 29 and 30 also has a blade carrier 86 which is arranged so as to be axially secured on supply hub 10, namely, through the use of axial retainer 29, 30 which hold blade carrier 86 in fixed axial arrangement relative to supply hub 10. Axial retainers 29 are formed by a stepping 27 at supply hub 10 and axial retaining means 30 are formed by a retaining ring 28 engaging in supply hub 10.

This blade carrier 86 has the characteristic that plastic shapings 97 are formed proceeding from an end face 88, which plastic shapings 97 project axially over the other end face 89 of blade carrier 86 and are used as swirl blades 15 of swirl blading 16. The plastic shapings 97 are arranged at substantially equal intervals relative to one another with respect to the circumference.

Figure 31:
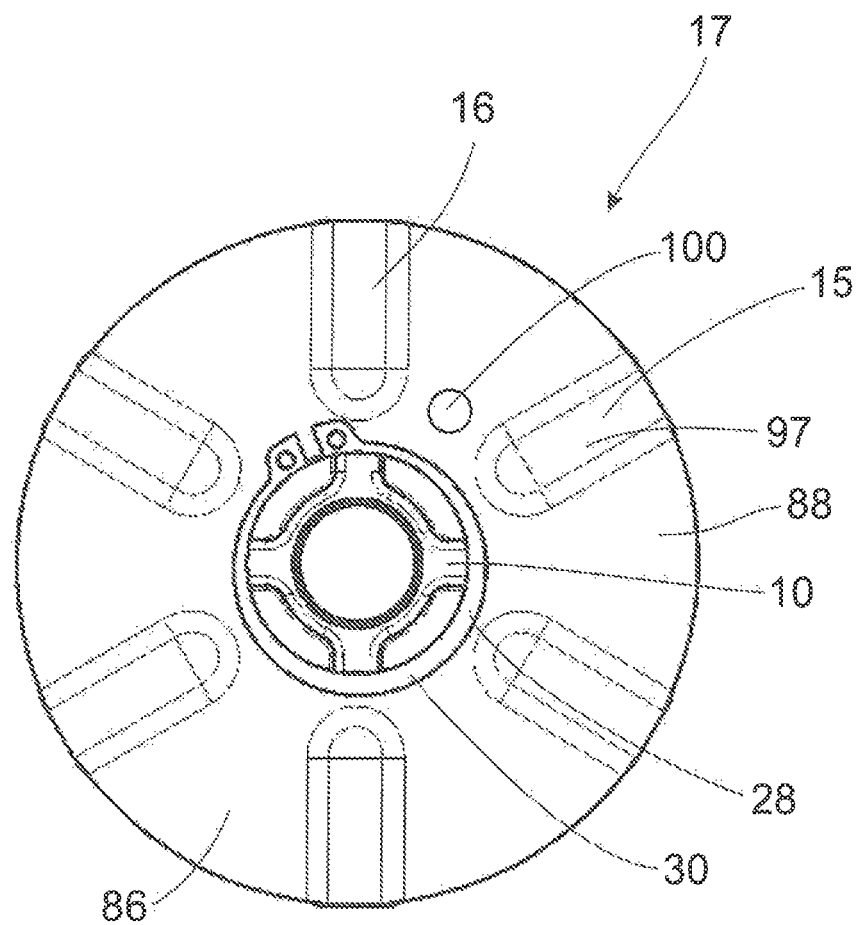
FIG. 31 is the swirl blading with an additional compensation orifice.

In contrast to the constructions described with reference to FIGS. 20 to 28, the retarding device 17 shown in FIGS. 29 and 30 is formed without cutouts or clearances. Therefore, a pressure level present on the end face 88 cannot arrive at end face 89 directly but rather only after radially overcoming swirl blading 16. In order to prevent this, at least one compensation orifice 100 which completely axially penetrates swirl blading 16 can be provided in circumferential direction according to FIG. 31.

Figure 32:
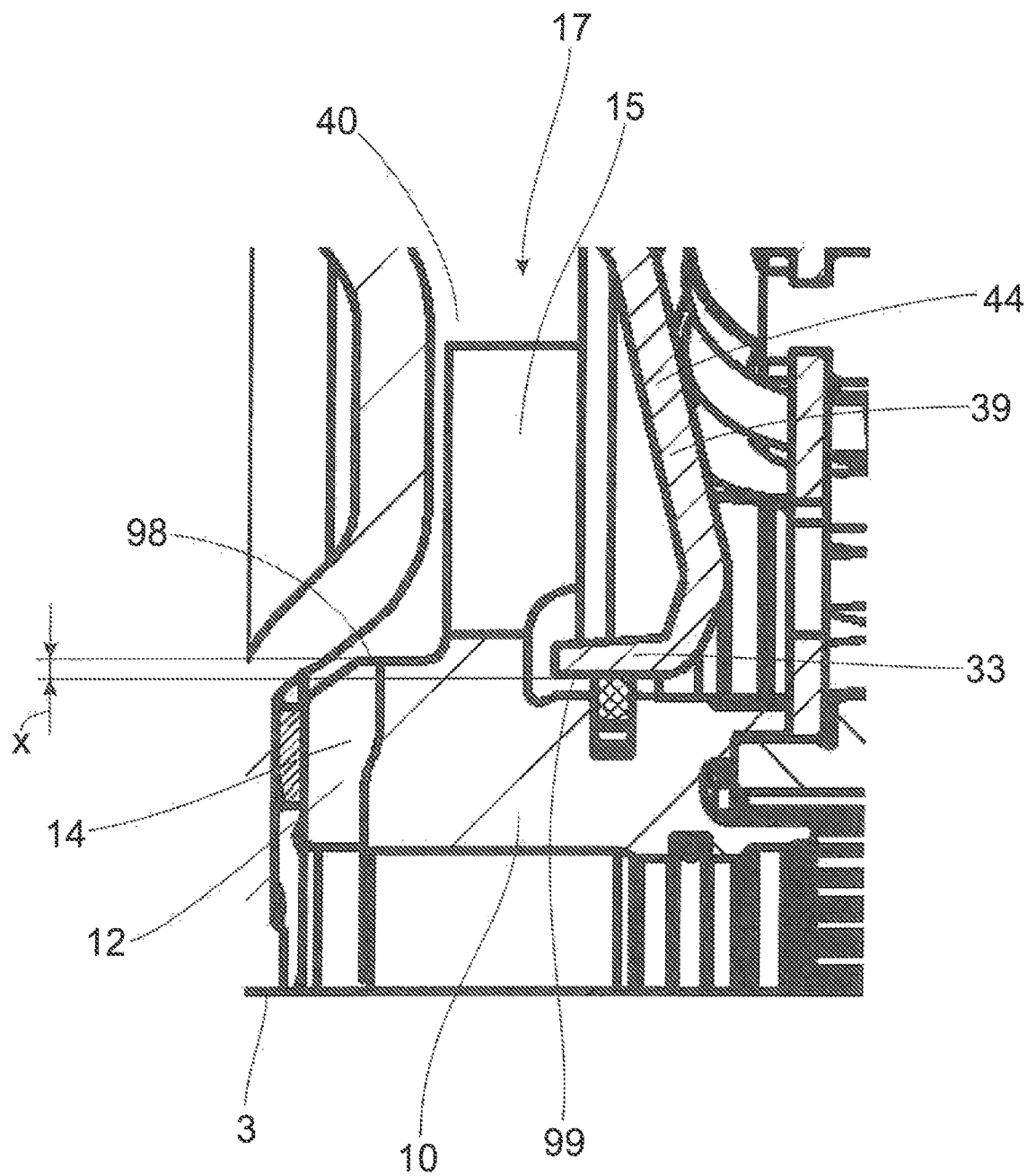
FIG. 32 is the supply hub with a through-opening area of the supply hub for pressure medium, which through-opening area is guided farther radially outward.

FIG. 32 shows a construction which substantially conforms to the construction according to FIGS. 1 and 2 and accordingly shows a retarding device 17 in which the swirl blades 15 of swirl blading 16 are formed in one piece with supply hub 10. However, in contrast to the construction in FIGS. 1 and 2, a through-opening area 12 with through-openings 14 is now shown in which the through-opening outlets 98 extend farther outward with respect to central axis 3 by a radial distance x than the radial inner diameter 99 of piston hub 33 of piston 39 of clutch device 44. Supplied pressure medium is accordingly conveyed into pressure space 40 at the speed of the retarding device 17 and is reinforced in this action by swirl blading 16.

Figure 33:
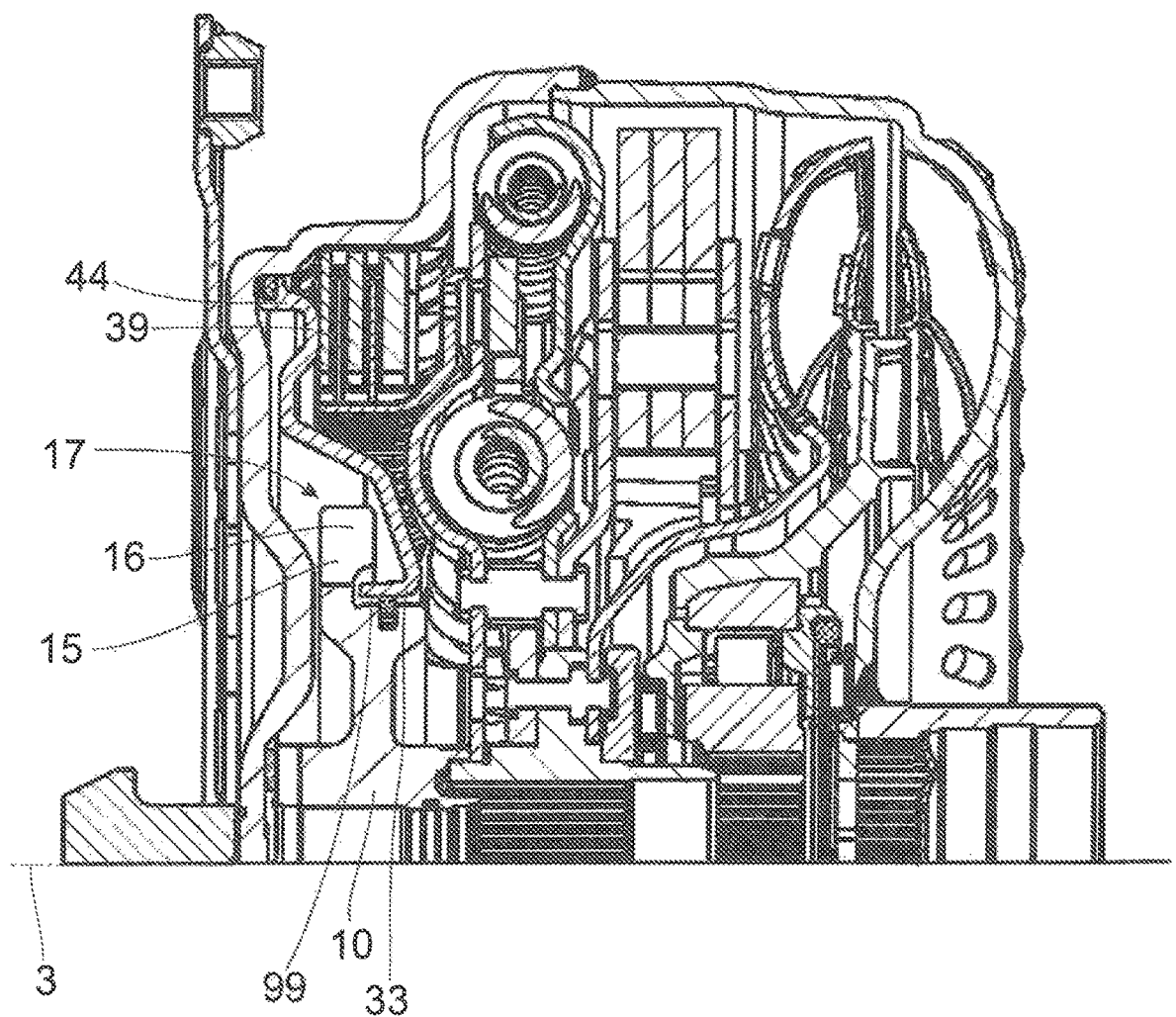
FIG. 33 is the hydro dynamic arrangement with a piston of a clutch device, which piston extends less far radially inward, and with a supply hub which projects farther radially outward and which has a retarding device.

FIG. 33 shows a further construction of the retarding device 17 in which swirl blades 15 of swirl blading 16 are formed in one piece with supply hub 10. However, supply hub 10 is extended very far radially outward with respect to central axis 3. Correspondingly, piston 39 of clutch device 44 has a large inner diameter 99 at its piston hub 33 but, since the outer diameter of piston 39 is not substantially different than in the constructions described heretofore, has a radially small extension compared to the piston 39 in the previously described constructions.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A hydrodynamic coupling arrangement comprising:
   a piston of a clutch device configured to substantially seal at least one pressure space relative to a toroidal space of a hydrodynamic circuit;
   pressure medium lines for conducting a pressure medium into or out of the at least one pressure space;
   a housing connected to the pressure medium lines;
   a receiving area rotatable relative to the housing and configured to axially displaceably receive a radially inner piston hub of the piston of the clutch device;
   at least one through-opening rotatable relative to the housing is provided in a through-opening area for producing at least one flow connection between at least one pressure medium line and the at least one pressure space; and a retarding device that is rotationally fixed to the receiving area and the through-opening area and configured to influence a flow of pressure medium in the at least one pressure space, wherein the flow of pressure medium arrives in the at least one pressure space after passing through the through-opening area, wherein the retarding device has a swirl blading provided with at least one swirl blade that at least substantially extends radially outward into the at least one pressure space.

2. The hydrodynamic coupling arrangement according to claim 1, wherein the at least one swirl blade of the swirl blading is received so as to be fixed with respect to relative rotation at a supply hub or at a blade hub received by the supply hub so as to be fixed with respect to rotation relative to it.

3. The hydrodynamic coupling arrangement according to claim 2, wherein the receiving area and/or the through-opening area is provided at the supply hub or at the blade hub.

4. The hydrodynamic coupling arrangement according to claim 2, wherein the swirl blading has a blade carrier, wherein in order to form the at least one swirl blade at least one blade carrier segment which is separated from the blade carrier by clearance machining is made to emerge with at least one component in axial direction relative to one of end faces of the blade carrier.

5. The hydrodynamic coupling arrangement according to claim 4, wherein the blade carrier, adjoining a blade carrier segment in circumferential direction in each instance, is provided with a radial cutout extending radially inward from a circumferential area.

6. The hydrodynamic coupling arrangement according to claim 4, wherein the blade carrier is fastened to the supply hub.

7. The hydrodynamic coupling arrangement according to claim 4, wherein the at least one swirl blade deviates from a radial direction with an inclination opposite to its rotational direction or with an inclination corresponding to its rotational direction.

8. The hydrodynamic coupling arrangement according to claim 2, wherein the swirl blading has a blade carrier, wherein in order to form the at least one swirl blade at least one blade carrier segment is made to emerge by plastic shaping of the blade carrier relative to an end face of one of its end faces.

9. The hydrodynamic coupling arrangement according to claim 8, wherein the blade carrier of the swirl blading has at least one through-pass opening in circumferential direction, the at least one through-pass opening extending axially between the end faces of the swirl blading.

10. The hydrodynamic coupling arrangement according to claim 8, wherein the at least one swirl blade deviates from a radial direction with an inclination opposite to its rotational direction or with an inclination corresponding to its rotational direction.

11. The hydrodynamic coupling arrangement according to claim 2, wherein the blade hub of the swirl blading is formed in one piece with the at least one swirl blade hub.

12. The hydrodynamic coupling arrangement according to claim 2, wherein at least one swirl blade is fastened to the blade hub of the swirl blading.

13. The hydrodynamic coupling arrangement according to claim 1, further comprising axial retainers for the at least one swirl blade that act in opposite directions relative to one another and are associated with the swirl blading.

14. The hydrodynamic coupling arrangement according to claim 1,
wherein the housing is rotatable about a central axis,
wherein the at least one swirl blade extends with at least one of:
at least one component radial to the central axis, and
at least one component in axial direction, which is an extension direction of the central axis.

15. The hydrodynamic coupling arrangement according to claim 14, wherein the at least one swirl blade is formed in radial direction and/or in axial direction at least substantially without curvature.

16. The hydrodynamic coupling arrangement according to claim 15, wherein the at least one swirl blade is formed so as to be inclined in radial direction.

17. The hydrodynamic coupling arrangement according to claim 16, wherein the at least one swirl blade deviates from a radial direction one of:
with an inclination opposite to its rotational direction or
with an inclination corresponding to its rotational direction.

18. The hydrodynamic coupling arrangement according to claim 15, wherein the at least one swirl blade is formed so as to be inclined relative to axial direction.

19. The hydrodynamic coupling arrangement according to claim 14, wherein the at least one swirl blade is formed in radial direction and/or in axial direction with curvature.

20. The hydrodynamic coupling arrangement according to claim 19, wherein the at least one swirl blade is formed so as to be inclined in radial direction.

21. The hydrodynamic coupling arrangement according to claim 19, wherein the at least one swirl blade is arranged so as to be inclined relative to axial direction.

22. The hydrodynamic coupling arrangement according to claim 1, wherein the at least one swirl blade is formed in one piece with a supply hub.

23. A hydrodynamic coupling arrangement comprising:
a piston of a clutch device configured to substantially seal at least one pressure space relative to a toroidal space of a hydrodynamic circuit;
pressure medium lines for conducting a pressure medium into or out of the at least one pressure space;
a housing connected to the pressure medium lines;
a central axis around which the housing is rotatable;
a receiving area rotatable relative to the housing and configured to axially displaceably receive a radially inner piston hub of the piston of the clutch device;
at least one through-opening rotatable relative to the housing is provided in a through-opening area for producing at least one flow connection between at least one pressure medium line and the at least one pressure space; and
a retarding device that is rotationally fixed to the receiving area and the through-opening area and configured to influence a flow of pressure medium in the at least one pressure space,
wherein the flow of pressure medium arrives in the at least one pressure space after passing through the through-opening area,
wherein at least one through-opening outlet of at least one through-opening of the through-opening area extends farther outward radially with respect to the central axis than an inner diameter of a radially inner piston hub of the piston, the inner diameter surrounding the receiving area.

\* \* \* \* \*